(12) United States Patent
Zembutsu

(10) Patent No.: US 10,494,188 B2
(45) Date of Patent: Dec. 3, 2019

(54) PALLET TRANSPORT DEVICE

(71) Applicant: NITTOKU ENGINEERING CO., LTD., Saitama-shi, Saitama (JP)

(72) Inventor: Hiroyuki Zembutsu, Fukushima (JP)

(73) Assignee: NITTOKU ENGINEERING CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 16/099,814

(22) PCT Filed: May 26, 2017

(86) PCT No.: PCT/JP2017/019658
§ 371 (c)(1),
(2) Date: Nov. 8, 2018

(87) PCT Pub. No.: WO2017/212945
PCT Pub. Date: Dec. 14, 2017

(65) Prior Publication Data
US 2019/0135548 A1 May 9, 2019

(30) Foreign Application Priority Data

Jun. 8, 2016 (JP) ................................. 2016-114049
Jun. 17, 2016 (JP) ................................. 2016-120419

(51) Int. Cl.
*B65G 35/06* (2006.01)
*B23Q 7/00* (2006.01)
*B65G 47/52* (2006.01)

(52) U.S. Cl.
CPC ............... *B65G 35/06* (2013.01); *B23Q 7/00* (2013.01); *B65G 47/52* (2013.01); *B65G 2201/0267* (2013.01)

(58) Field of Classification Search
CPC ........ B65G 35/06; B65G 47/52; B65G 15/24; B65G 2201/0267; B23Q 7/00; B23Q 41/02
(Continued)

(56) References Cited

U.S. PATENT DOCUMENTS 3,779,410 A * 12/1973 Phillips .................. B65G 35/06
414/418
4,279,410 A * 7/1981 Bolza-Schunemann ......................
B41F 13/56
270/50

(Continued)

FOREIGN PATENT DOCUMENTS

JP H01313214 A 12/1989
JP 2011-093032 A 5/2011
TW 201502046 A 1/2015

*Primary Examiner* — James R Bidwell
(74) *Attorney, Agent, or Firm* — Rabin & Berdo, P.C.

(57) ABSTRACT

A pallet transport device (10) includes: pallet rails (21, 31, 36); moving mechanisms (41, 51, 56) that move a pallet (11) along the pallet rails (21, 31, 36); a transfer mechanism (61) that transfers the pallet (11) guided by one of the pallet rails (21, 31, 36) to another pallet rail (21, 31, 36) using a pivoting member (62) and a retaining rail (63); a moving assistance mechanism (81) that moves the pallet (11) from the pallet rails (21, 31, 36) to the retaining rail (63), or from the retaining rail (63) to the pallet rails (21, 31, 36); and an elevator mechanism (95) configured to cause the moving assistance mechanism (81) to ascend and descend. When the elevator mechanism (95) has caused the moving assistance mechanism (81) to descend, the transfer mechanism (61) is in a state where it is capable of causing the pivoting member (62) to pivot.

7 Claims, 17 Drawing Sheets

(58) Field of Classification Search
USPC .................................. 198/465.1, 465.2, 580
See application file for complete search history.

(56) References Cited

U.S. PATENT DOCUMENTS

| | | | | |
|---|---|---|---|---|
| 4,515,264 | A * | 5/1985 | Sticht | B65G 37/02 |
| | | | | 198/345.3 |
| 5,090,555 | A * | 2/1992 | Kura | B65G 35/06 |
| | | | | 198/465.1 |
| 5,465,827 | A * | 11/1995 | Nakagawa | B65G 35/06 |
| | | | | 104/168 |
| 6,626,282 | B1 * | 9/2003 | Nishizawa | B23P 19/001 |
| | | | | 198/465.2 |
| 10,071,864 | B2 * | 9/2018 | Saito | B23Q 16/08 |
| 2003/0057060 | A1 * | 3/2003 | Richardson | B23Q 5/341 |
| | | | | 198/580 |
| 2006/0010681 | A1 | 1/2006 | Bernhard et al. | |
| 2011/0100783 | A1 | 5/2011 | Baba | |
| 2015/0175362 | A1 | 6/2015 | Saito | |
| 2016/0272473 | A1 * | 9/2016 | Mohr | B65G 35/06 |
| 2018/0043489 | A1 * | 2/2018 | Suzuki | B23Q 41/02 |
| 2018/0044117 | A1 * | 2/2018 | Suzuki | B23Q 7/00 |
| 2019/0009990 | A1 * | 1/2019 | Nara | B65G 35/06 |

* cited by examiner

PALLET TRANSPORT DEVICE

TECHNICAL FIELD

The present invention relates to a pallet transport device that transports a plurality of pallets having workpieces and the like placed thereon along pallet rails.

BACKGROUND ART

Conventionally, there are transport devices that, on a production line, transport a workpiece and cause a machine tool at a transport destination to apply predetermined processing to the workpiece. JP 2011-93032A (FIG. 11) discloses a pallet transport device that transports a plurality of pallets having workpieces placed thereon by circulating the pallets on a track-like path composed of two linear portions and two curved line portions that connect between the linear portions.

This transport device includes first and second pallet rails that extend in parallel to each other, first and second pallet moving mechanisms that move the pallets guided to the first and second pallet rails along the first and second pallet rails, and pallet transfer mechanisms that transfer the pallets on a semicircular path from an end portion of the first or second pallet rail to an end portion the second or first pallet rail.

In the pallet transport device configured in the foregoing manner, pallets that have been moved by the first or second pallet moving mechanism along the first or second pallet rail are transferred by the pallet transfer mechanisms on a semicircular path from the end portion of the first or second pallet rail to the end portion of the second or first pallet rail. The transferred pallets are moved again by the second or first pallet moving mechanism along the second or first pallet rail. In this way, conventional circulation-type pallet transport devices circulate and transport a plurality of pallets on a track-like path.

SUMMARY OF INVENTION

In conventional pallet transport devices, in order to transfer pallets using the pallet transfer mechanisms, the engagement between the pallet moving mechanisms and the pallets is broken at the end portions of the first and second pallet rails. This places the pallets in a state where they cannot be moved by the pallet moving mechanisms.

When the pallets that have reached the end portions of the first and second pallet rails cannot be moved by the pallet moving mechanisms as just explained, the pallets that have been transferred to the end portions of the first and second pallet rails cannot be moved along the first and second pallet rails. As a result, there is a possibility that smooth transport of the pallets through circulation on a track-like path becomes difficult.

The present invention aims to reliably transfer pallets from end portions of pallet rails, and also to reliably move the pallets transferred to the end portions of the pallet rails along the pallet rails.

According to one aspect of the present invention, a pallet transport device includes a plurality of pallet rails configured to movably guide a pallet; a plurality of moving mechanisms provided for the respective pallet rails, the plurality of moving mechanisms being configured to move the pallet along the pallet rails; a transfer mechanism including a pivoting member and a retaining rail, the pivoting member being pivotable around a pivot axis in a horizontal direction, the retaining rail being mounted on the pivoting member and capable of retaining the pallet, the transfer mechanism being configured to transfer the pallet guided by one of the pallet rails to another one of the pallet rails using the pivoting member and the retaining rail; a moving assistance mechanism configured to move the pallet from the pallet rails to the retaining rail, or from the retaining rail to the pallet rails; and an elevator mechanism configured to cause the moving assistance mechanism to ascend and descend. When the elevator mechanism has caused the moving assistance mechanism to descend, the transfer mechanism becomes in a state where the transfer mechanism is capable of causing the pivoting member to pivot.

DESCRIPTION OF EMBODIMENTS

The following describes embodiments of the present invention with reference to drawings.

First Embodiment

A description is now given of a pallet transport device 10 according to a first embodiment of the present invention with reference to FIGS. 1 to 14. In each drawing, three axes X, Y, Z that are orthogonal to one another are set. A configuration of the pallet transport device 10 will be described under the assumption that the X-axis, Y-axis, and Z-axis extend respectively in a substantially horizontally sideways direction, a substantially horizontally front-back direction, and a vertical direction.

The pallet transport device 10 is a device that transports a plurality of pallets 11 having non-illustrated workpieces placed thereon along a plurality of pallet rails 21, 31.

Figure 1:
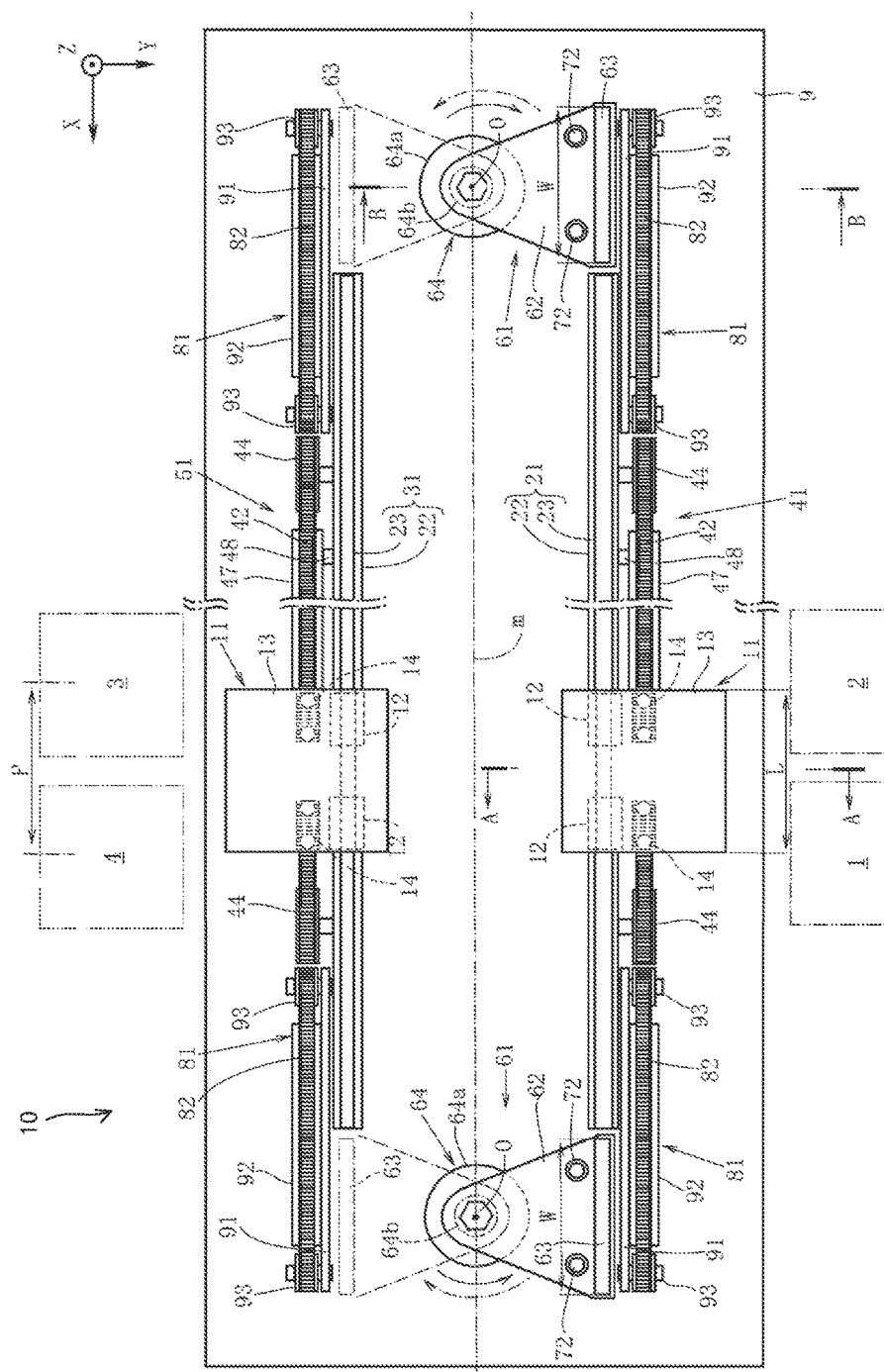
FIG. 1 is a plan view of a pallet transport device according to a first embodiment of the present invention.

FIG. 1 shows a case where four machine tools 1 to 4 are provided on the opposite sides of the pallet transport device 10. Note that the number of the machine tools 1 to 4 is not limited in this way, and may be increased or reduced as appropriate depending on processing applied to the workpieces.

The pallet transport device 10 includes a first pallet rail 21 and a second pallet rail 31 as a plurality of pallet rails by which the pallets 11 are movably guided. The first pallet rail 21 and the second pallet rail 31 are arranged in parallel to each other at a predetermined interval in a horizontal direction (Y-axis direction).

The first and second pallet rails 21, 31 are mounted on a rack 9 so as to extend straight in an X-axis direction.

Figure 4:
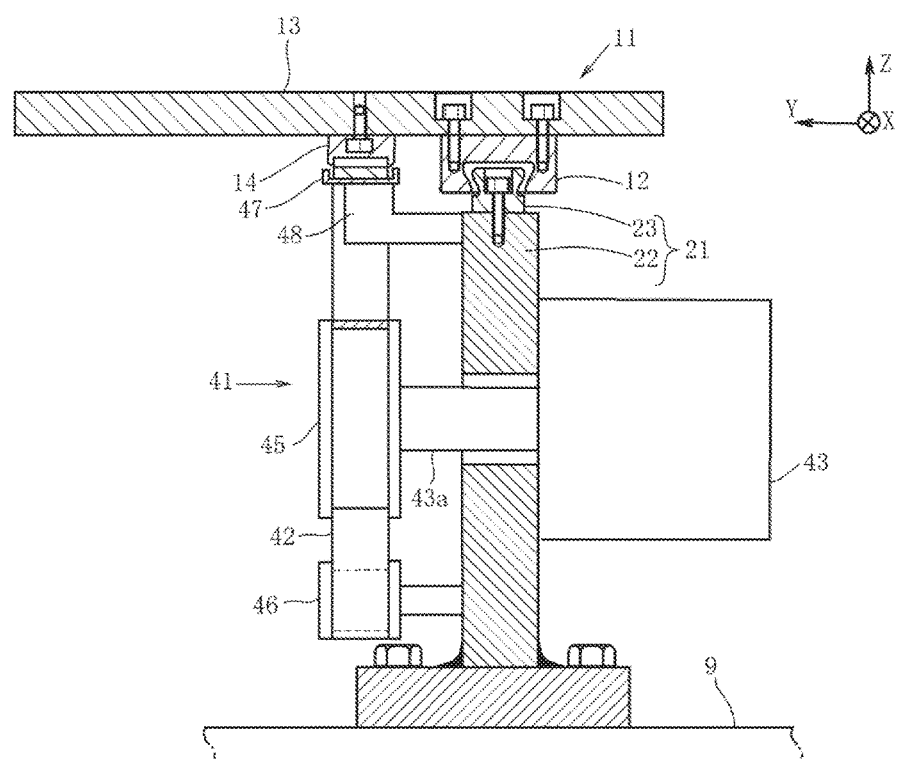
FIG. 4 is a cross-sectional view taken along the line A-A in FIG. 1.
Figure 5:
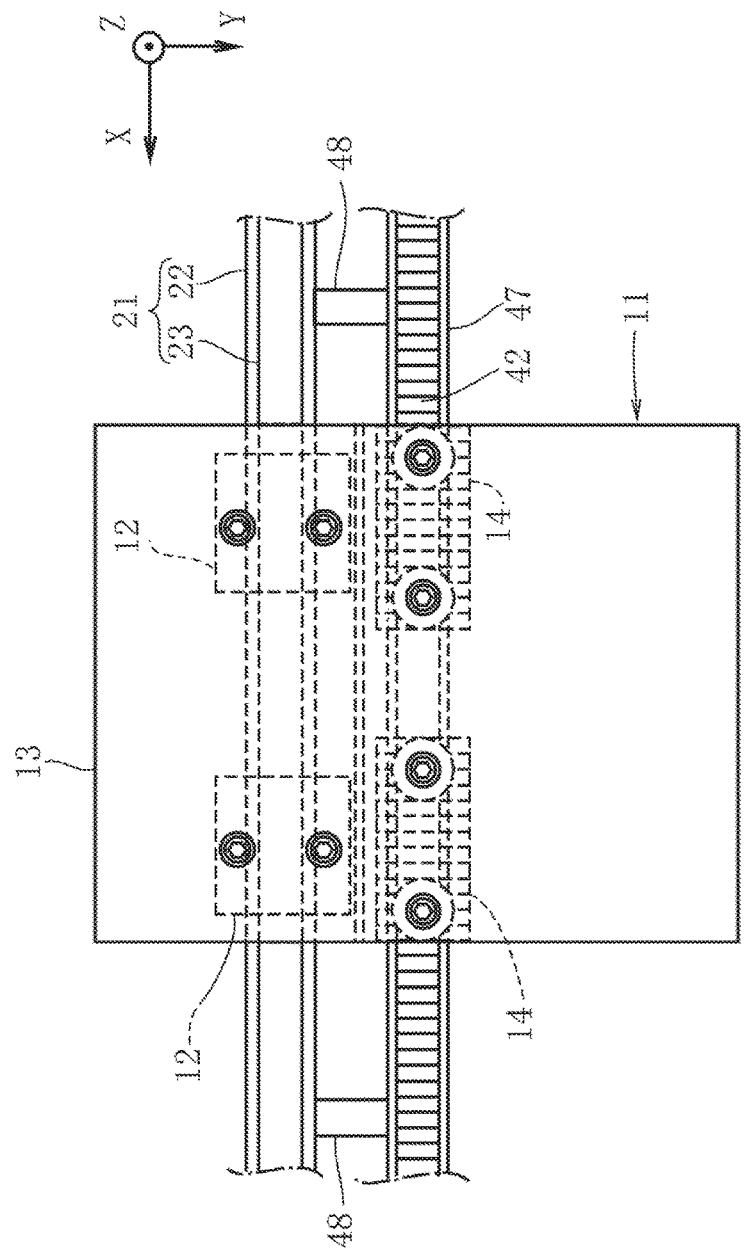
FIG. 5 is a plan view of a pallet as viewed in the direction C in FIG. 2.

As they are structured in the same manner, only the first pallet rail 21 will be described. The first pallet rail 21 is intended to retain the pallets 11 in a horizontal state, and includes a support plate 22 that is fixed to the rack 9 and a linear-motion guide rail 23 that is fixedly screwed to an upper edge of the support plate 22 as shown in FIGS. 4 and 5.

Each pallet 11 includes linear-motion blocks 12 that are formed so as to overpass the linear-motion guide rail 23, a base 13 screwed to the linear-motion blocks 12, and locking members 14 mounted on the base 13.

The linear-motion blocks 12 are commercially sold in a pair with the linear-motion guide rail 23, and preferably include a non-illustrated roller retainer. By using the linear-motion blocks 12 including the roller retainer, a movement of the pallet 11 in a width direction (Y-axis direction) and tilting thereof with respect to the first and second pallet rails 21, 31 are restrained, and resistance associated with a movement of the pallet 11 on the first and second pallet rails 21, 31 can be reduced.

A non-illustrated placing tool for placing a workpiece is mounted on one side portion of an upper surface of the base 13. The linear-motion blocks 12 are fixed to a lower surface of the other side portion of the base 13. The locking members 14 are fixed to a lower surface of the base 13 between the linear-motion blocks 12 and the placing tool.

As the linear-motion blocks 12, which are fixed to the lower surface of the other side portion of the base 13, overpass the linear-motion guide rails 23 of the first and second pallet rails 21, 31, the pallet 11 is movably retained in the horizontal state by the first and second pallet rails 21, 31.

As shown in FIG. 1, it is preferable that the bases 13 of the pallets 11 be formed in such a manner that a length L thereof in the X-axis direction is the same as or smaller than a pitch P at which the machine tools 1 to 4 are installed.

When the plurality of pallets 11 move on the first and second pallet rails 21, 31 at the predetermined pitch P in a state where workpieces are placed thereon, the plurality of pallets 11 face the machine tools 1 to 4 substantially at the same time. Therefore, the workpieces placed via the placing tools, which are each mounted on one side portion of the base 13 of the corresponding pallet 11, can be processed by the machine tools 1 to 4 substantially at the same time.

Figure 2:
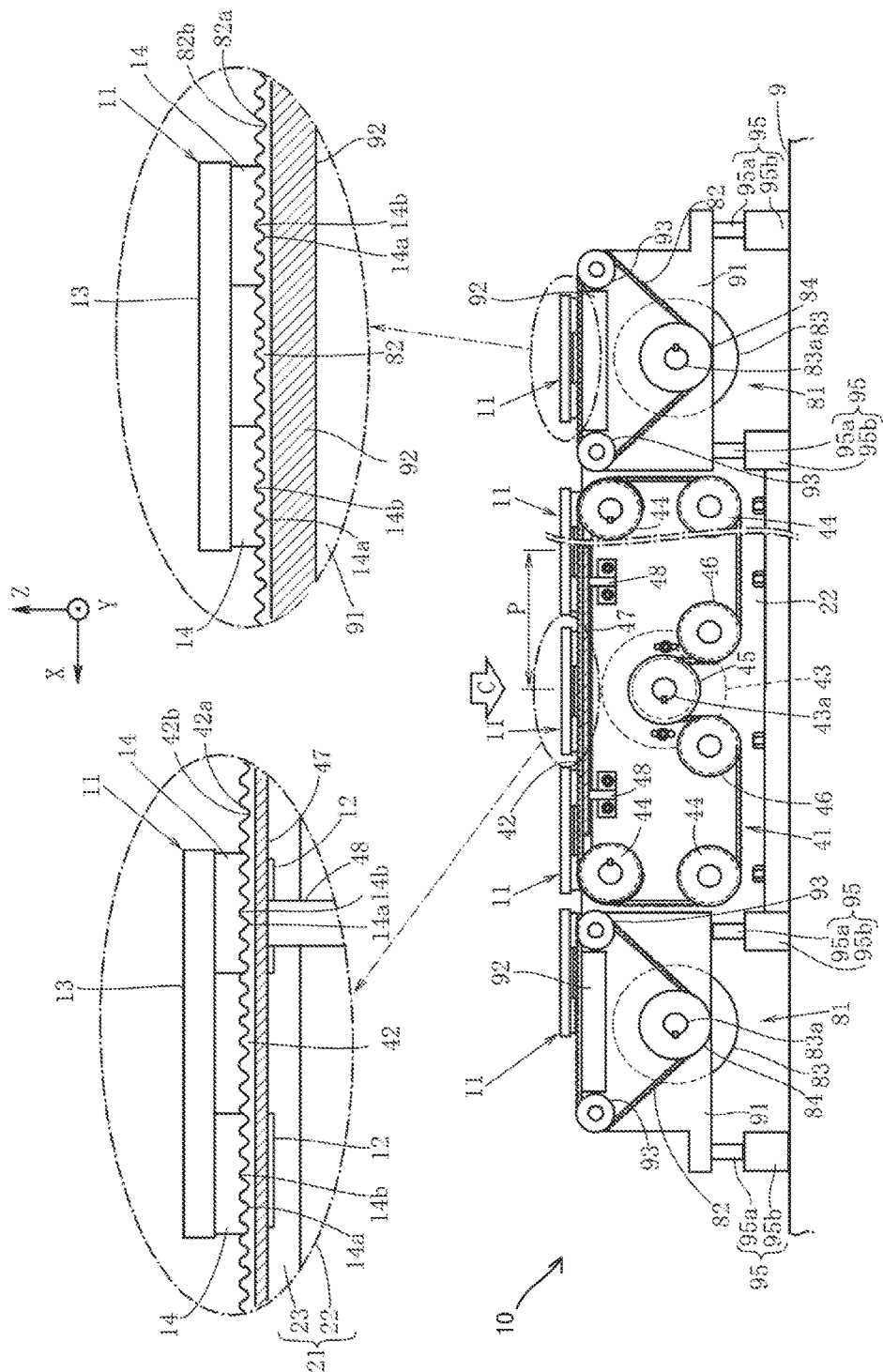
FIG. 2 is a front view of the pallet transport device according to the first embodiment of the present invention.

As shown in FIGS. 1 and 2, the pallet transport device 10 further includes a first moving mechanism 41 that moves the pallets 11 guided to the first pallet rail 21 along the first pallet rail 21, and a second moving mechanism 51 that moves the pallets 11 guided to the second pallet rail 31 along the second pallet rail 31.

As the first moving mechanism 41 and the second moving mechanism 51 are structured in the same manner, only the first moving mechanism 41 will be described below.

The first moving mechanism 41 includes an endless circulation belt 42 that is configured to be engageable with the pallets 11 and circulated along the first pallet rail 21, and a circulation mechanism 43 that circulates the circulation belt 42.

As shown in FIG. 2, when viewed in the Y-axis direction, follower pulleys 44 are provided at four corners of the support plate 22 of the first pallet rail 21. The circulation belt 42 is hung around these four follower pulleys 44.

Furthermore, on the support plate 22, a servomotor 43 is mounted as a circulation mechanism that circulates the circulation belt 42. A driving pulley 45 is attached to a rotation shaft 43a of the servomotor 43. The driving pulley 45 is disposed on the same plane as the four follower pulleys 44. In addition, a pair of turning pulleys 46 is mounted on the support plate 22 in the vicinity of the driving pulley 45. The circulation belt 42 is turned by the pair of turning pulleys 46 so as to be hung around the driving pulley 45.

When the servomotor 43 is driven by an instruction from a non-illustrated controller, the driving pulley 45 rotates together with the rotation shaft 43a, and the circulation belt 42 hung around the driving pulley 45 and the follower pulleys 44 is circulated.

As shown in an enlarged view of FIG. 2, the circulation belt 42 is a so-called toothed belt; projection portions 42a and recess portions 42b that extend in a width direction are provided on an outer surface of the circulation belt 42 in an alternating manner in a longitudinal direction.

On the other hand, projection portions 14a and recess portions 14b are provided on lower surfaces of the pallets 11 as engagement portions that are engageable with the projection portions 42a and the recess portions 42b. Specifically, the projection portions 14a and the recess portions 14b are formed on the locking members 14 that are fixed to the lower surfaces of the pallets 11.

As such, the locking members 14, which are mounted on the lower surfaces of the pallets 11 similarly to the linear-motion blocks 12, are structured to be engageable with the circulation belt 42. That is, when the locking members 14 overlie the circulation belt 42, the projection portions 14a and the recess portions 14b formed on the locking members 14 engage with the projection portions 42a and the recess portions 42b formed on the circulation belt 42. When the locking members 14 are distanced upward from the circulation belt 42, the engagement between the projection portions 42a and the recess portions 42b of the circulation belt 42 and the projection portions 14a and the recess portions 14b of the locking members 14 is broken.

When the projection portions 14a and the recess portions 14b of the pallets 11 are in engagement with the projection portions 42a and the recess portions 42b of the circulation belt 42, the pallets 11 cannot move freely in the X-axis direction. Therefore, circulating the circulation belt 42 by driving the servomotor 43 in this state will move the pallets 11 together with the circulation belt 42 along the first pallet rail 21 or the second pallet rail 31 along which the circulation belt 42 extends.

Furthermore, a support member 47 is provided between follower pulleys 44 in order to prevent the circulation belt 42 from loosening and getting separated from the locking members 14. As shown in FIG. 2, the support member 47 is attached to the support plate 22 via attachment tools 48.

As shown in FIG. 1, the pallet transport device 10 further includes transfer mechanisms 61 that are disposed at the opposite end portions of the first and second pallet rails 21, 31.

The transfer mechanisms 61 are intended to transfer a pallet 11 guided by any one of the first and second pallet rails 21, 31 to the other of the second and first pallet rails 31, 21.

The transfer mechanisms 61 are actuated in transferring a pallet 11 that has moved to an end portion of the first pallet rail 21 to an end portion of the second pallet rail 31, and in transferring a pallet 11 that has moved to an end portion of the second pallet rail 31 to an end portion of the first pallet rail 21.

Each transfer mechanism 61 includes a pivoting member 62 that is pivotable around a pivot axis O in the horizontal direction, a retaining rail 63 mounted on the pivoting member 62, and an actuator 64 (see FIGS. 6 and 7) that cause the pivoting member 62 to pivot around the pivot axis O. Note that in FIG. 1, the pivot axis O extends in the vertical direction, and is positioned on an intermediate line m, which is indicated by a dash-and-dot line, between the first and second pallet rails 21, 31 that are arranged at a predetermined interval in the horizontal direction.

Figure 6:
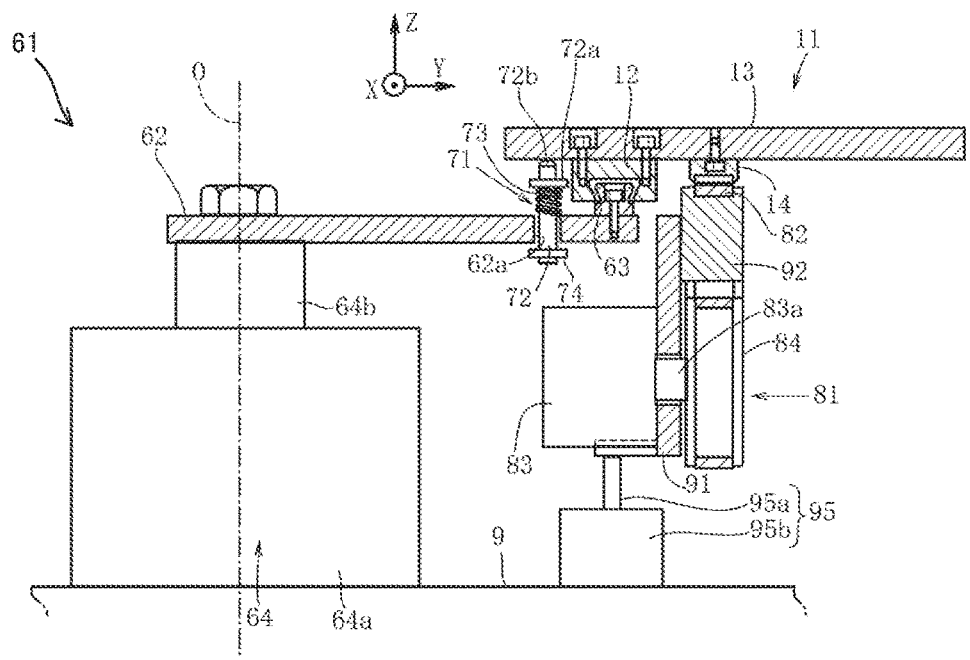
FIG. 6 is a cross-sectional view taken along the line B-B in FIG. 1, and shows a transfer mechanism.
Figure 7:
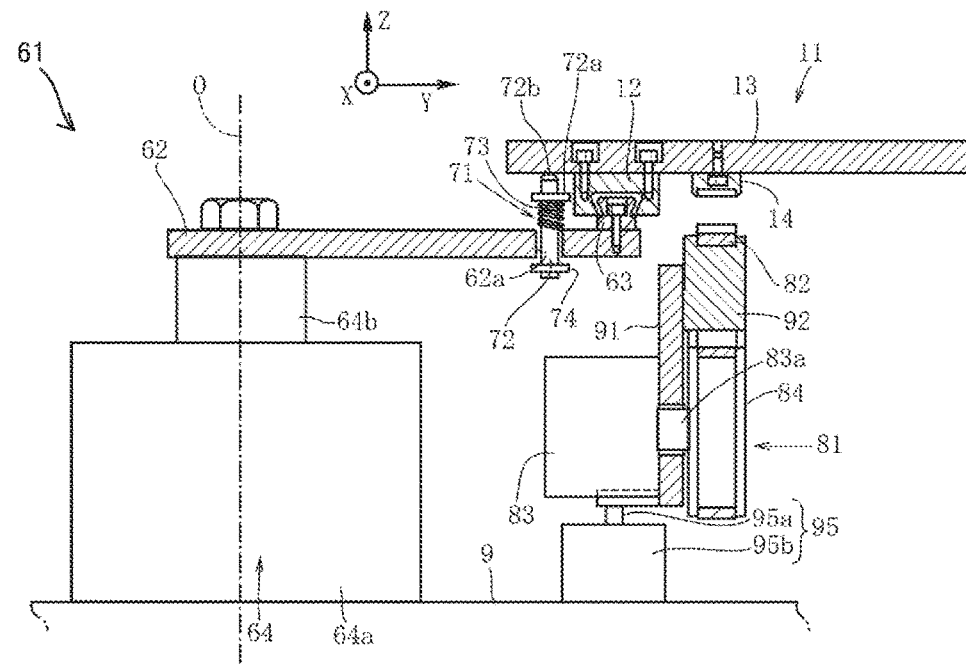
FIG. 7, which corresponds to FIG. 6, shows a state where elevator mechanisms have caused a moving assistance mechanism to descend.

As shown in FIGS. 6 and 7, the actuator 64 includes a main body portion 64a having a shape of a quadrilateral box, and a rotation rod 64b that projects upward from a substantially central portion of an upper surface of the main body portion 64a. The main body portion 64a of the actuator 64 is attached to the rack 9 in such a manner that an axial center of the rotation rod 64b coincides with an axial center of the pivot axis O, in other words, in such a manner that the axial center of the rotation rod 64b is positioned on the intermediate line m.

The pivoting member 62 is screwed in a horizontal state to an upper end of the rotation rod 64b. The actuator 64 is configured to enable the rotation rod 64b to pivot in a forward direction and a reverse direction within 180 degrees with the aid of a fluid pressure that is supplied to and discharged from the main body portion 64a. Therefore, as the actuator 64 pivots, the pivoting member 62 pivots around the pivot axis O as indicated by a solid-line arrow in FIG. 10.

As shown in FIG. 1, when viewed in a Z-axis direction, the pivoting member 62 is a trapezoidal plate member that increases in width from one end side joined to the rotation rod 64b toward the other end side. The retaining rail 63 is provided at the wide base edge side, or the other end side, of the pivoting member 62 so as to extend in a direction of a tangent to a pivoting direction of the pivoting member 62. The material of the retaining rail 63 is the same as that of the linear-motion guide rails 23 of the first and second pallet rails 21, 31.

The retaining rail 63 is formed to have a length W that is the same as or larger than the length L of each pallet 11 in the X-axis direction. A length from the pivot axis O to the retaining rail 63 is set to be half of the interval between the first pallet rail 21 and the second pallet rail 31.

In this way, as the retaining rail 63 that is arranged continuously with the linear-motion guide rail 23 of the first pallet rail 21 pivots around the pivot axis O by 180 degrees together with the pivoting member 62, the retaining rail 63 is arranged continuously with the linear-motion guide rail 23 of the second pallet rail 31.

When the retaining rail 63 is thus arranged collinearly with the linear-motion guide rail 23 of the first pallet rail 21 or the second pallet rail 31, the pallets 11 can be moved from the linear-motion guide rail 23 to the retaining rail 63, and from the retaining rail 63 to the linear-motion guide rail 23.

Furthermore, as shown in FIGS. 6 and 7, the pivoting member 62 is provided with a pallet locking mechanism 71 that restrains a movement of a pallet 11 retained by the retaining rail 63 along the retaining rail 63.

The pallet locking mechanism 71 includes elevator rods 72 whose upper ends can come into contact with the pallet 11 retained by the retaining rail 63, elastic bodies 73 that push the elevator rods 72 in a direction in which the elevator rods 72 are pushed against the pallet 11, and stoppers 74 that regulate an ascending amount of the elevator rods 72.

Through holes 62a through which the elevator rods 72 are inserted are formed in the pivoting member 62. The elevator rods 72 are arranged movably in the vertical direction along the through holes 62a. Flanges 72a are provided in the vicinity of the upper ends of the elevator rods 72 that project upward from the through holes 62a.

The elastic bodies, or coil springs, 73 are interposed in a compressed state between the flanges 72a and the pivoting member 62. Therefore, the elevator rods 72 are pushed upward by a pushing force exerted by the coil springs 73 that try to extend.

The stoppers 74 are provided in the vicinity of lower ends of the elevator rods 72 that project downward from the through holes 62a. The stoppers 74 come into contact with hole edges of the through holes 62a from below, thereby preventing the elevator rods 72 from ascending by an amount equal to or larger than a predetermined amount.

Tips 72b of the elevator rods 72 are formed in a shape of a circular cone or a hemisphere. When a pallet 11 has moved from the first pallet rail 21 or the second pallet rail 31 to the retaining rail 63 in a state where the stoppers 74 are in contact with the hole edges of the through holes 62a, the base 13 of the pallet 11 comes into contact with the tips 72b of the elevator rods 72. If the pallet 11 further moves, the elevator rods 72 will be pressed downward by the pallet 11 via slanted portions or hemispherical portions of the tips 72b, and move downward due to the compression of the coil springs 73.

When the pallet 11 has moved onto the retaining rail 63, the tips 72b of the elevator rods 72 are pressed against the base 13 of the pallet 11 by the pushing force of the coil springs 73. Due to contact resistance that is generated at this time between the elevator rods 72 and the base 13, the pallet 11 is retained by the retaining rail 63. Thus, the pallet 11 is prevented from moving freely along the retaining rail 63.

In this state, if the retaining rail 63 pivots together with the pivoting member 62 after a later-described moving assistance mechanism 81 has descended, the retaining rail 63 that retains the pallet 11 will move from a first position that is collinear with the pallet rail 21 to a second position that is collinear with the second pallet rail 31. During this movement, the pallet locking mechanism 71 prevents misalignment of the pallet 11 retained by the retaining rail 63 relative to the retaining rail 63.

Figure 10:
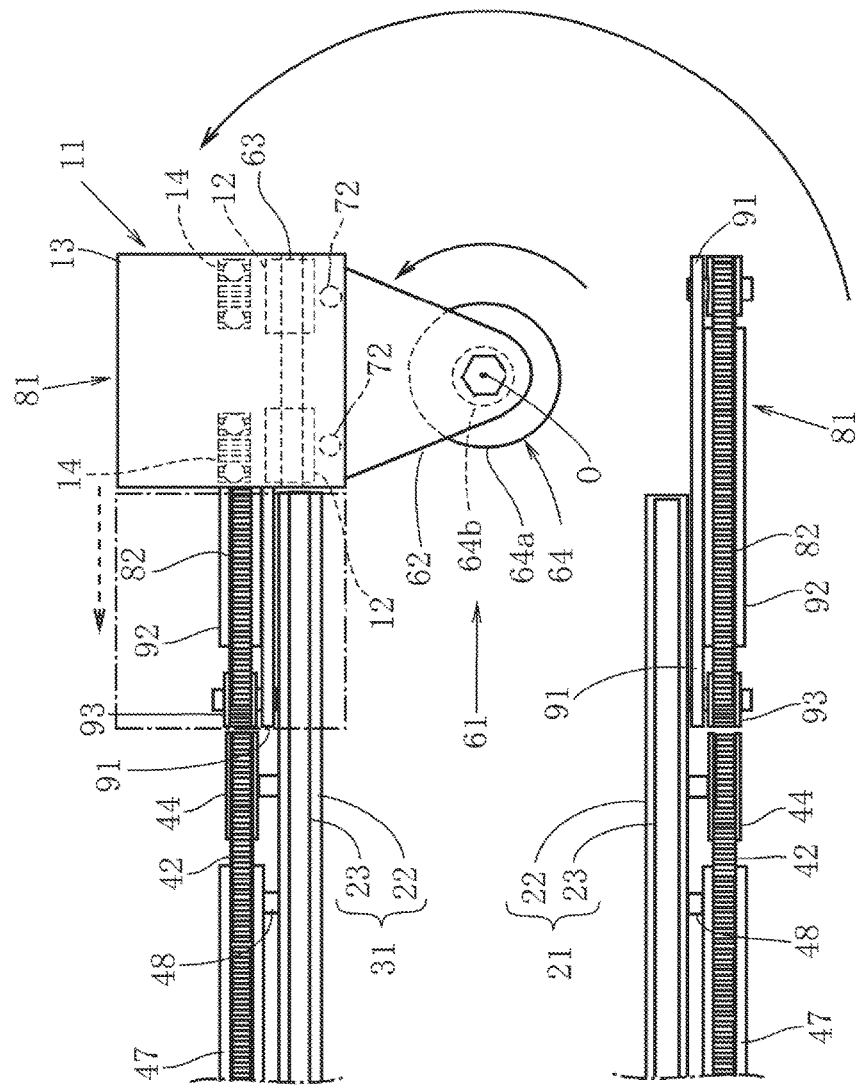
FIG. 10, which corresponds to FIG. 8, shows a state where a pivoting member has pivoted together with a pallet retained by a retaining rail.

Once the retaining rail 63 that retains the pallet 11 has moved to the second position, the retaining rail 63 becomes collinear with the second pallet rail 31 as shown in FIG. 10.

In this state, the pallet 11 retained by the retaining rail 63 can be moved to the second pallet rail 31 by moving the pallet 11 against the contact resistance that is generated as the coil springs 73 press the elevator rods 72 against the base 13 of the pallet 11.

As shown in FIGS. 1 and 2, the pallet transport device 10 further includes moving assistance mechanisms 81 that move the pallets 11 from the first pallet rail 21 or the second pallet rail 31 to the retaining rail 63, or from the retaining rail 63 to the first pallet rail 21 or the second pallet rail 31.

The moving assistance mechanisms 81 are provided at the opposite end portions of the first and second pallet rails 21, 31. As they are structured in the same manner, the structure of one of them will be described.

The moving assistance mechanism 81 includes an endless auxiliary circulation belt 82 that is circulated along the retaining rail 63 and the end portion of the first pallet rail 21 or the second pallet rail 31 that is positioned collinearly with the retaining rail 63, and an auxiliary circulation mechanism 83 that circulates the auxiliary circulation belt 82. The auxiliary circulation belt 82 is arranged collinearly with the circulation belt 42 so as to be continuous with the circulation belt 42.

As shown in an enlarged view of FIG. 2, the auxiliary circulation belt 82 is a so-called toothed belt that is similar to the circulation belt 42; projection portions 82a and recess portions 82b that extend in a width direction are formed on an outer surface of the auxiliary circulation belt 82 in an alternating manner in a longitudinal direction. The projection portions 14a and the recess portions 14b, which serve as engagement portions formed on the locking members 14 of the pallets 11, are also engageable with these projection portions 82a and recess portions 82b.

As shown in FIGS. 2 and 6, an auxiliary plate 91 is attached to the rack 9 via later-described elevator mechanisms, or fluid pressure cylinders, 95. The auxiliary plate 91 is disposed on the same plane as the support plate 22 of the first pallet rail 21 or the second pallet rail 31 so as to be continuous with the support plate 22.

A guide member 92 that extends in the X-axis direction is horizontally mounted on an upper end of the auxiliary plate 91 along the end portion of the first pallet rail 21 or the second pallet rail 31 and the retaining rail 63 that is continuous with the first pallet rail 21 or the second pallet rail 31.

The guide member 92 is intended to support, from below, the auxiliary circulation belt 82 that is circulated along the end portion of the first pallet rail 21 or the second pallet rail 31 and the retaining rail 63 that is continuous with the first pallet rail 21 or the second pallet rail 31.

Furthermore, when viewed in the Y-axis direction, auxiliary pulleys 93 that are rotatably supported by the auxiliary plate 91 are provided on the opposite sides of the guide member 92. Also, the auxiliary circulation mechanism, or servomotor, 83 that circulates the auxiliary circulation belt 82 is mounted on the support plate 91. An auxiliary driving pulley 84 is attached to a rotation shaft 83a of the servomotor 83.

The auxiliary driving pulley 84 is disposed on the same plane as the two auxiliary pulleys 93, and the auxiliary circulation belt 82 is hung around the auxiliary driving pulley 84 and the auxiliary pulleys 93.

When the servomotor 83 is driven by an instruction from the non-illustrated controller, the auxiliary circulation belt 82 hung around the auxiliary driving pulley 84 is circulated, and the auxiliary circulation belt 82 between the two auxiliary pulleys 93 moves in the X-axis direction on an upper surface of the guide member 92 from the end portion of the first pallet rail 21 or the second pallet rail 31 along the retaining rail 63 that is continuous with the first pallet rail 21 or the second pallet rail 31.

Similarly to the circulation belt 42, the projection portions 82a and the recess portions 82b that extend in the width direction are formed continuously on the outer surface of the auxiliary circulation belt 82 in an alternating manner in the longitudinal direction. Therefore, when the locking members 14 overlie the auxiliary circulation belt 82, the projection portions 82a and the recess portions 82b formed on the auxiliary circulation belt 82 engage with the projection portions 14a and the recess portions 14b formed on the locking members 14.

Figure 8:
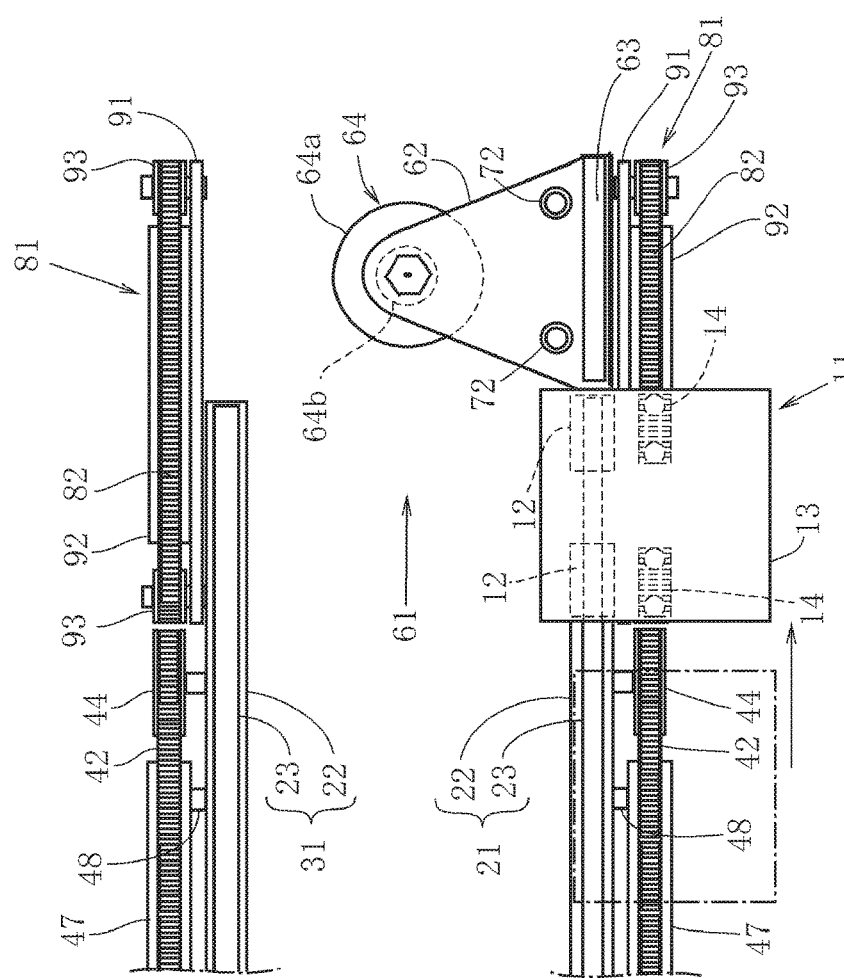
FIG. 8 is a top view showing a state where a transported pallet has reached an end portion of a first pallet rail.

Therefore, when the auxiliary circulation belt 82 is circulated at the same speed and in the same direction as the circulation belt 42 in a state where the projection portions 82a and the recess portions 82b of the auxiliary circulation belt 82 are continuous with the projection portions 42a and the recess portions 42b of the circulation belt 42, a pallet 11 that moves on the first pallet rail 21 while in engagement with the circulation belt 42 is brought into engagement with the auxiliary circulation belt 82 at the end portion of the first pallet rail 21 as indicated by a solid-line arrow in FIG. 8.

As shown in FIG. 2, when the projection portions 14a and the recess portions 14b of the pallet 11 are in engagement with the projection portions 82a and the recess portions 82b of the auxiliary circulation belt 82, the pallet 11 cannot move freely in the X-axis direction. Therefore, circulating the auxiliary circulation belt 82 in this state will move the pallet 11 together with the auxiliary circulation belt 82 along the retaining rail 63 and the first pallet rail 21 or the second pallet rail 31 along which the auxiliary circulation belt 82 extends.

Figure 9:
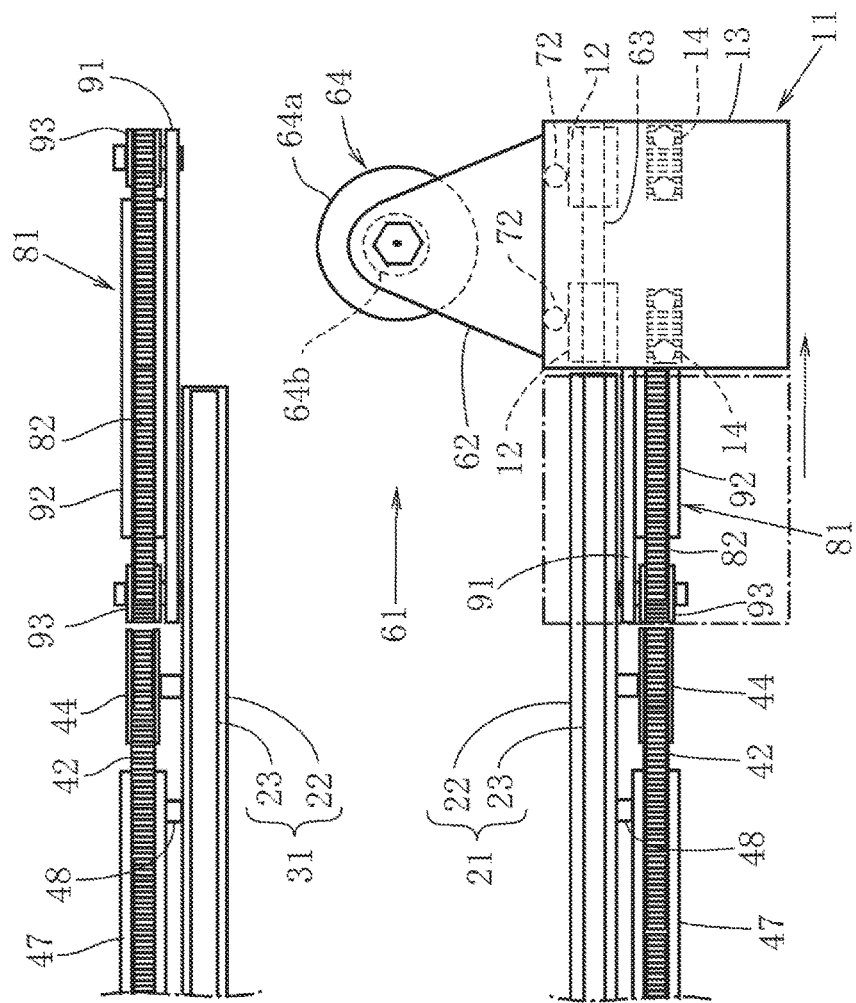
FIG. 9, which corresponds to FIG. 8, is a top view showing a state where a pallet has moved from the end portion of the first pallet rail to a retaining rail.

As shown in FIG. 9, further circulating the auxiliary circulation belt 82 that is in engagement with the locking members 14 will move the pallet 11 from the end portion of the first pallet rail 21 to the retaining rail 63 that is arranged continuously with the first pallet rail 21. Note that circulating the auxiliary circulation belt 82 in the reverse direction in this state will enable the pallet 11 on the retaining rail 63 to move to the first pallet rail 21 or the second pallet rail 31.

Figure 3:
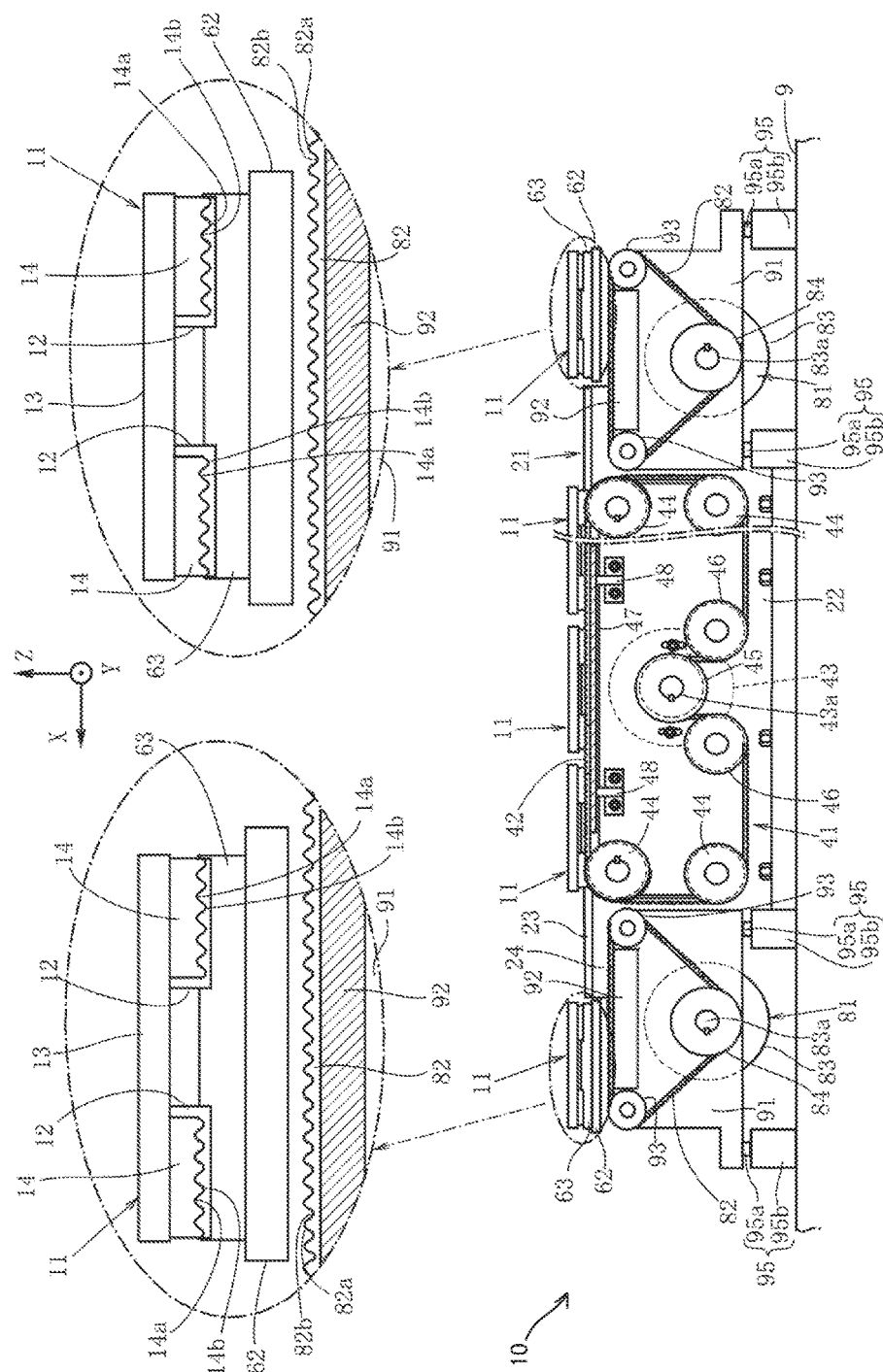
FIG. 3, which corresponds to FIG. 2, shows a state where elevator mechanisms have caused moving assistance mechanisms to descend.

Also, as shown in FIGS. 2 and 3, the pallet transport device 10 further includes the elevator mechanisms 95 that cause the moving assistance mechanisms 81 to ascend and descend. The elevator mechanisms 95 are constituted by a pair of fluid pressure cylinders 95 having main bodies 95b that are fixed to the rack 9 in a state where reciprocable rods 95a face upward. Upper ends of the reciprocable rods 95a of these fluid pressure cylinders 95 are fixed to the auxiliary plates 91.

When the reciprocable rods 95a of the fluid pressure cylinders 95 project upward, the auxiliary circulation belts 82 of the moving assistance mechanisms 81 are in a state where they are in contact with the locking members 14 of the pallets 11 retained by the retaining rails 63.

On the other hand, as shown in FIG. 3, because the locking members 14 are mounted on the lower surfaces of the bases 13 of the pallets, when the reciprocable rods 95a of the fluid pressure cylinders 95 are inserted into the main bodies 95b, the moving assistance mechanisms 81 including the auxiliary plates 91 descend, and accordingly, the auxiliary circulation belts 82 attached to the auxiliary plates 91 descend as well.

Here, the pivoting members 62 provided with the retaining rails 63 cannot pivot freely in a state where the pallets 11 are retained by the retaining rails 63 due to the pallet locking mechanisms 71 and the projection portions 14a and the recess portions 14b of the locking members 14 of the pallets 11 are in engagement with the projection portions 82a and the recess portions 82b formed on the auxiliary circulation belts 82.

On the other hand, as shown in FIGS. 3 and 7, even in a state where the locking members 14 overlie the auxiliary circulation belts 82 when viewed in the Z-axis direction, if the moving assistance mechanisms 81 descend together with the auxiliary plates 91, the projection portions 82a and the recess portions 82b formed on the auxiliary circulation belts 82 will move downward and be separated from the projection portions 14a and the recess portions 14b of the locking members 14 of the pallets 11. This releases the engagement between the auxiliary circulation belts 82 and the locking members 14.

By thus releasing the engagement between the projection portions 82a and the recess portions 82b of the auxiliary circulation belts 82 and the projection portions 14a and the recess portions 14b of the locking members 14, the transfer mechanisms 61 are placed in a state where the retaining rails 63 that retain the pallets 11, together with the pivoting members 62, can pivot in the horizontal direction.

Furthermore, as shown in FIGS. 2, 6, and 10, when the retaining rail 63 mounted on the pivoting member 62 is arranged at a position that is continuous with the first pallet rail 21 or the second pallet rail 31, the reciprocable rods 95a of the fluid pressure cylinders 95 are caused to project upward again, thereby causing the ascent of the auxiliary plates 91 that have descended. Once the moving assistance mechanisms 81 have ascended together with the auxiliary plates 91, the projection portions 82a and the recess portions 82b formed on the auxiliary circulation belts 82 engage again with the projection portions 14a and the recess portions 14b of the locking members 14.

The following describes a pallet transport method using the pallet transport device 10 configured in the foregoing manner.

The pallet transport method using the pallet transport device 10 is intended to circulate the pallets 11, and includes: a first pallet transport step of transporting a pallet 11 guided to the first pallet rail 21 along the first pallet rail 21; a first pallet transfer step of transferring the pallet 11 that has reached the end portion of the first pallet rail 21 to the second pallet rail 31; a second pallet transport step of transporting the pallet 11 guided to the second pallet rail 31 along the second pallet rail 31; and a second pallet transfer step of transferring the pallet 11 that has reached the end portion of the second pallet rail 31 to the first pallet rail 21.

In the present embodiment, it will be assumed that the pallets 11 are circulated counterclockwise in FIG. 1. Each step will be described below.

First Pallet Transport Step

In this step, a pallet 11 guided to the first pallet rail 21 is transported along the first pallet rail 21.

The linear-motion blocks 12 of the pallet 11 are placed to fit on the linear-motion guide rail 23, with predetermined backlash, from the end portion of the first pallet rail 21. As a result, the pallet 11 is placed in a state where it is guided by the first pallet rail 21.

When the pallet 11 is thus placed in the state where it is guided by the first pallet rail 21, the projection portions 14a and the recess portions 14b provided on the pallet 11 engage with the projection portions 42a and the recess portions 42b of the circulation belt 42 that is provided along the first pallet rail 21. Therefore, by circulating the circulation belt 42 through driving of the servomotor 43 in this state, the pallet 11 can be transported along the first pallet rail 21.

The transport is carried out until the pallet 11 faces the machine tool 1 or 2 provided along the first pallet rail 21. When the pallet 11 is in a state where it faces the machine tool 1 or 2, the servomotor 43 is stopped, and the machine tool 1 or 2 applies processing to the workpiece placed on the pallet 11. At this time, transporting a plurality of pallets 11 at a pitch equal to the pitch P between the machine tools 1, 2 enables the plurality of machine tools 1, 2 to apply processing simultaneously.

First Pallet Transfer Step

In this step, a pallet 11 that has reached the end portion of the first pallet rail 21 is transferred to the second pallet rail 31. The transfer in this step is carried out by the transfer mechanism 61 disposed at one end portion of the first and second pallet rails 21, 31.

The auxiliary circulation belt 82 is provided continuously with the circulation belt 42. Thus, by causing the reciprocable rods 95a of the fluid pressure cylinders 95 to project upward and causing the moving assistance mechanism 81 to ascend in the aforementioned first pallet transport step, the pallet 11 that moves along the first pallet rail 21 is placed in a state where it engages with the auxiliary circulation belt 82 immediately before it reaches the end portion of the first pallet rail 21 as indicated by a solid-line arrow in FIG. 8.

Therefore, by circulating the auxiliary circulation belt 82 at the same speed and in the same direction as the circulation belt 42 in a state where the projection portions 82a and the recess portions 82b of the auxiliary circulation belt 82 are continuous with the projection portions 42a and the recess portions 42b of the circulation belt 42, the pallet 11 is moved to the end portion of the first pallet rail 21.

Here, the auxiliary circulation belt 82, which is circulated from the end portion of the pallet rail 21 along the retaining rail 63 that is positioned collinearly with the first pallet rail 21, is provided continuously with the circulation belt 42. However, they are driven by separate servomotors. Thus, by circulating the circulation belt 42 in a state where the circulation of the auxiliary circulation belt 82 is stopped and the pallet 11 that is in engagement with the auxiliary circulation belt 82 is kept in place at the end portion of the first pallet rail 21, another pallet 11 can be moved along the first pallet rail 21. That is, by providing the auxiliary circulation belt 82 continuously with the circulation belt 42, the first pallet transport step of moving a pallet 11 can be carried out on the first pallet rail 21 separately from the first pallet transfer step.

In the first pallet transfer step, first, the actuator 64 of the transfer mechanism 61 causes the pivoting member 62 to pivot so as to position the retaining rail 63 collinearly with the first pallet rail 21. In this state, a pallet 11 that has moved to the end portion of the first pallet rail 21 is moved from the first pallet rail 21 to the retaining rail 63 by circulating the auxiliary circulation belt 82, and the pallet 11 is retained by the retaining rail 63 as shown in FIG. 9.

At this time, as shown in FIG. 6, once the pallet 11 has moved from the first pallet rail 21 to the retaining rail 63, the base 13 of the pallet 11 comes into contact with the slanted portions of the circular cones or the hemispherical portions formed on the tips 72b of the elevator rods 72 provided in the pivoting member 62. Then, the elevator rods 72 are pressed downward by the pallet 11 via the slanted portions or the hemispherical portions of the tips 72b, and move downward due to the compression of the coil springs 73. Once the pallet 11 has moved to the retaining rail 63, the tips 72b of the elevator rods 72 are pressed against the base 13 of the pallet 11 by the pushing force of the coil springs 73. Due to the contact resistance between the elevator rods 72 and the base 13, the pallet 11 retained by the retaining rail 63 is prevented from moving freely along the retaining rail 63. In this way, in the course of the transfer of the pallet 11 to the second pallet rail 31 on a semicircular path, the pallet 11 is maintained in a state where it is retained by the retaining rail 63 without falling.

Subsequently, the reciprocable rods 95a of the fluid pressure cylinders 95 are inserted into the main bodies 95b in this state as shown in FIG. 3. As the moving assistance mechanism 81 attached to the upper ends of the reciprocable rods 95a descends, the engagement between the pallet 11 and the auxiliary circulation belt 82 is broken as shown in FIG. 7.

After the engagement between the pallet 11 and the auxiliary circulation belt 82 is broken, as shown in FIG. 10, the actuator 64 causes the pivoting member 62 to pivot, and the retaining rail 63 that retains the pallet 11 is transferred on a semicircular path from the first position continuous with the first pallet rail 21 to the second position continuous with the second pallet rail 31. At this time, the moving assistance mechanism 81, which is provided continuously with the second pallet rail 31, has been caused to descend in advance.

After the retaining rail 63 that retains the pallet 11 is positioned collinearly with the linear-motion guide rail 23 of the second pallet rail 31, the reciprocable rods 95a of the fluid pressure cylinders 95 of the elevator mechanism provided continuously with the second pallet rail 31 are caused to project upward, thereby causing the moving assistance mechanism 81, which has descended, to ascend as shown in FIG. 2.

As a result, the locking members 14 of the pallet 11 overlie the auxiliary circulation belt 82 of the moving assistance mechanism 81, and the projection portions 82a and the recess portions 82b formed on the auxiliary circulation belt 82 engage with the projection portions 14a and the recess portions 14b of the locking members 14.

During the ascent of the moving assistance mechanism 81, a rotation angle of the servomotor 83 is controlled by a program that has been set in advance so that the moving assistance mechanism 81 is placed at a position that reliably achieves the engagement between the projection portions 14a and the recess portions 14b of the locking members 14 of the pallet 11 and the projection portions 82a and the recess portions 82b of the auxiliary circulation belt 82.

Thereafter, the auxiliary circulation belt 82 that is in engagement with the pallet 11 is circulated, and the pallet 11 moves, together with the auxiliary circulation belt 82, against the contact resistance associated with contact between the elevator rods 72 and the base 13. Accordingly, the pallet 11 retained by the retaining rail 63 moves from the retaining rail 63 to the second pallet rail 31 as indicated by a dash-line arrow in FIG. 10.

In this way, the pallet 11 is transferred from the end portion of the first pallet rail 21 to the end portion of the second pallet rail 31.

Second Pallet Transport Step

In this step, a pallet 11 guided to the second pallet rail 31 is transported along the second pallet rail 31. In the first pallet transfer step that precedes the present step, the pallet 11 moved from the retaining rail 63 to the end portion of the second pallet rail 31 while in engagement with the auxiliary circulation belt 82 as shown in FIG. 10.

In the second pallet transport step, in order to move the pallet 11, which moved to the end portion of the second pallet rail 31, further along the second pallet rail 31, the circulation belt 42 that is provided continuously with the auxiliary circulation belt 82 is circulated along the second pallet rail 31. Specifically, the circulation belt 42 is circulated at the same speed and in the same direction as the auxiliary circulation belt 82 in a state where the projection portions 42a and the recess portions 42b of the circulation belt 42 are continuous with the projection portions 82a and the recess portions 82b of the auxiliary circulation belt 82.

Figure 11:
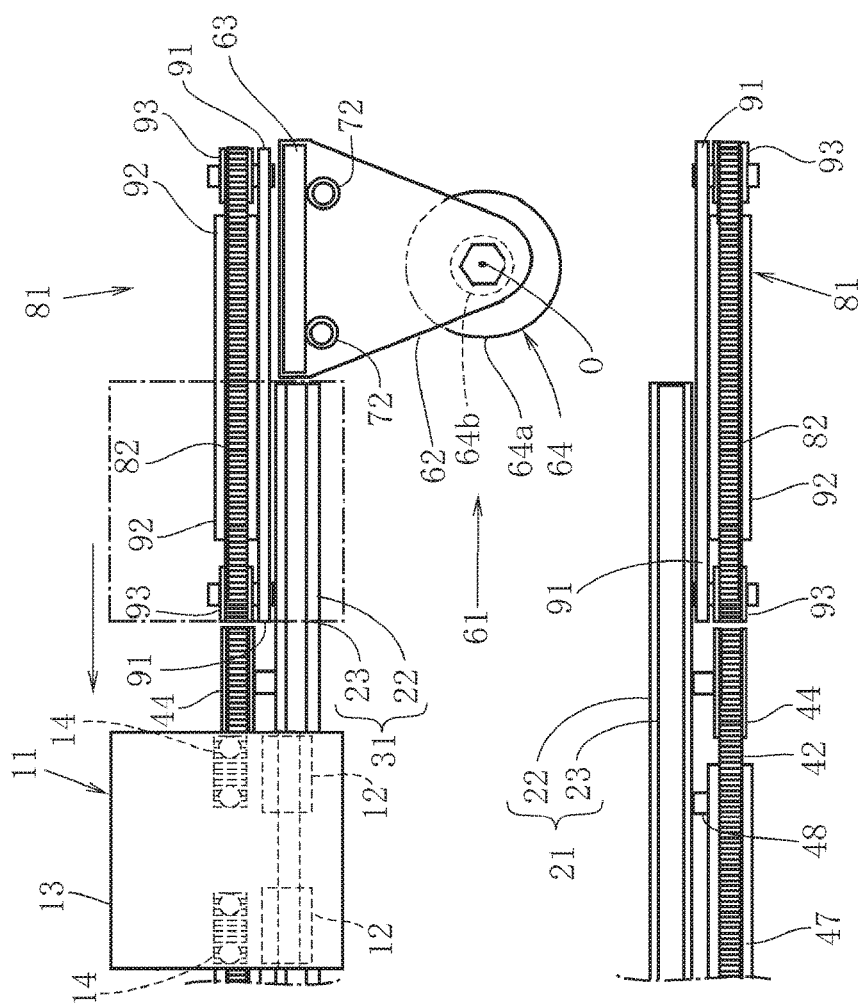
FIG. 11, which corresponds to FIG. 8, is a top view showing a state where a pallet retained by a retaining rail has been moved to a second pallet rail.

Accordingly, the pallet 11 starts to move from the end portion of the second pallet rail 31 toward the center of the second pallet rail 31. As shown in FIG. 11, once the pallet 11 has been separated from the end portion of the second pallet rail 31, the pallet 11 is in a state where it is in engagement only with the circulation belt 42. Therefore, by circulating the circulation belt 42, the pallet 11 can be transported along the second pallet rail 31.

The transport along the second pallet rail 31 is carried out until the pallet 11 faces the machine tool 3 or 4 provided along the second pallet rail 31. When the pallet 11 is in a state where it faces the machine tool 3 or 4, the servomotor 43 is stopped, and the machine tool 3 or 4 applies processing to the workpiece placed on the pallet 11.

Here, the auxiliary circulation belt 82, which is circulated along the retaining rail 63 and the end portion of the second pallet rail 31 that is positioned collinearly with the retaining rail 63, is provided continuously with the circulation belt 42. However, they are driven by separate servomotors. Therefore, the circulation of the circulation belt 42 and the circulation of the auxiliary circulation belt 82 are carried out separately. As shown in FIG. 10, the pallet 11 can be kept in place at the end portion of the second pallet rail 31 by stopping the circulation of the auxiliary circulation belt 82 after the pallet 11 is moved from the retaining rail 63 to the end portion of the second pallet rail 31 by the circulation of the auxiliary circulation belt 82.

Furthermore, by circulating the circulation belt 42 separately from the circulation of the auxiliary circulation belt 82, only a pallet 11 that is in engagement with the circulation belt 42 is transported along the second pallet rail 31. That is, only a pallet 11 that has been guided to the second pallet rail 31 and is in engagement with the circulation belt 42 can be moved, without moving a pallet 11 that is kept in place at the end portion of the second pallet rail 31 while in engagement with the auxiliary circulation belt 82.

Therefore, when an interval between the pallet 11 that is in engagement only with the circulation belt 42 and the pallet 11 that is in engagement only with the auxiliary circulation belt 82 has become equal to the predetermined pitch, the auxiliary circulation belt 82 is circulated to move the pallet 11 that is in engagement with the auxiliary circulation belt 82, thereby bringing the pallet 11 into engagement with the circulation belt 42. This makes it possible to transport a plurality of pallets 11 on the second pallet rail 31 at the predetermined pitch.

In this way, transporting a plurality of pallets 11 at a pitch equal to the pitch P between the machine tools 3, 4 enables the plurality of machine tools 3, 4 to apply processing simultaneously.

Second Pallet Transfer Step

In this step, a pallet 11 that has reached the end portion of the second pallet rail 31 is transferred to the first pallet rail 21. The transfer in this step is carried out by the transfer mechanism 61 disposed at the other end portion of the first and second pallet rails 21, 31. As a specific transfer procedure is the same as that in the aforementioned first pallet transfer step, a description thereof will be omitted.

By carrying out each of the aforementioned steps once in the above-described manner, each pallet 11 is transported in a counterclockwise direction on a track-like path in such a manner that it switches positions with a preceding pallet 11.

Once the operation of the pallet transport device 10 has stopped after each step has been carried out once, the machine tools 1 to 4 apply predetermined processing to the workpieces placed on the pallets 11 in parallel. During the application of the processing by the machine tools 1 to 4, a workpiece is imported to or exported from one of the pallets 11.

As described above, the pallet transport device 10 includes the auxiliary circulation belts 82 that are engageable with the pallets 11 retained by the retaining rails 63. Therefore, by circulating the auxiliary circulation belts 82, the pallets 11 can be reliably moved from the retaining rails 63 to the pallet rails 21, 31, and also from the pallet rails 21, 31 to the retaining rails 63.

The pallet transport device 10 further includes the elevator mechanisms 95 that cause the moving assistance mechanisms 81 to ascend and descend. Thus, causing the moving assistance mechanisms 81 to descend will release the engagement between the pallets 11 retained by the retaining rails 63 and the auxiliary circulation belts 82 of the moving assistance mechanisms 81. Accordingly, by causing the pivoting member 62 to pivot together with the retaining rail 63, a pallet 11 can be reliably transferred on a semicircular path from the end portion of one pallet rail 21 to the end portion of the other pallet rail 31.

Furthermore, after the pivoting member 62 has pivoted together with the retaining rail 63, a pallet 11 retained by the retaining rail 63 is brought into engagement with the auxiliary circulation belt 82 again by causing the moving assistance mechanism 81 to ascend. Thus, the pallet 11 that has been transferred on a semicircular path together with the retaining rail 63 can be reliably moved from the retaining rail 63 that is arranged continuously with the end portion of the other pallet rail 31 to the other pallet rail 31.

In this way, the pallet transport device 10 can reliably circulate the pallets 11 on a track-like path.

Here, another conceivable means to establish and release the engagement between the pallets 11 and the moving assistance mechanisms 81 is the ascent and descent of the pallets 11. However, this means has a possibility that an amount of power consumed for the ascent and descent of the pallets 11 becomes enormous because the weight of the pallets 11 having the workpieces placed thereon is relatively large. Furthermore, as the workpieces ascend and descend together with the pallets 11, there is a possibility that the structure of the placing tools for retaining the workpieces becomes complicated for the purpose of preventing misalignment of the workpieces caused by vibration and shock during the ascent and descent.

In contrast, in the present embodiment, the moving assistance mechanisms 81 ascend and descend rather than the pallets 11. Therefore, the engagement between the pallets 11 and the moving assistance mechanisms 81 can be established and broken using a small amount of power. Furthermore, as the workpieces do not ascend and descend, either, the structure of the placing tools for retaining the workpieces can be made relatively simple.

Furthermore, the present embodiment adopts a configuration in which the pivoting members 62 pivot, thereby moving the retaining rails 63 disposed at the other end sides of the pivoting members 62 in an arc-like or semicircular manner. Thus, it is relatively easy to place the retaining rails 63 at a position that is continuous with the first pallet rail 21 or the second pallet rail 31, and the structure of the transfer mechanisms 61 including the pivoting members 62 and the like can be simplified.

Furthermore, the actuators 64 that cause the pivoting members 62 to pivot are configured to enable the rotation rods 64b to pivot in the forward direction and the reverse direction using a fluid pressure. Thus, the structure of the transfer mechanisms 61 is further simplified. As a result, an increase in the manufacturing cost of the pallet transport device 10 can be restrained.

Furthermore, on each pallet 11, a workpiece is placed on one side portion of the base 13, whereas the linear-motion blocks 12 are fixed to the other side portion of the base 13. Thus, when the linear-motion blocks 12 are supported by the first and second pallet rails 21, 31, the pallet 11 can be circulated on a track-like path in a state where the one side portion of the base 13, on which the workpiece is placed, is always facing the outer side of a circulation path. This makes it possible to install the processing machines 1 to 4 for workpieces on the opposite sides of the pallet transport device 10.

Furthermore, the pallet transport device 10 transports the pallets 11 along the first pallet rail 21 and the second pallet rail 31 by bringing the pallets 11 into engagement with the endless circulation belts 42. In this way, by changing a position at which a pallet 11 engages with a circulation belt 42, an interval between this pallet 11 and a pallet 11 that was transported earlier along the first pallet rail 21 or the second pallet rail 31 while in engagement with the circulation belt 42, that is to say, a transport pitch between the pallets 11 can easily be changed.

Therefore, even if a work transport pitch needs to be altered due to, for example, a change in the machine tools 1 to 4 or a change in a processing target, the alteration can be handled by changing the transport pitch without changing the pallets 11 themselves.

Figure 12:
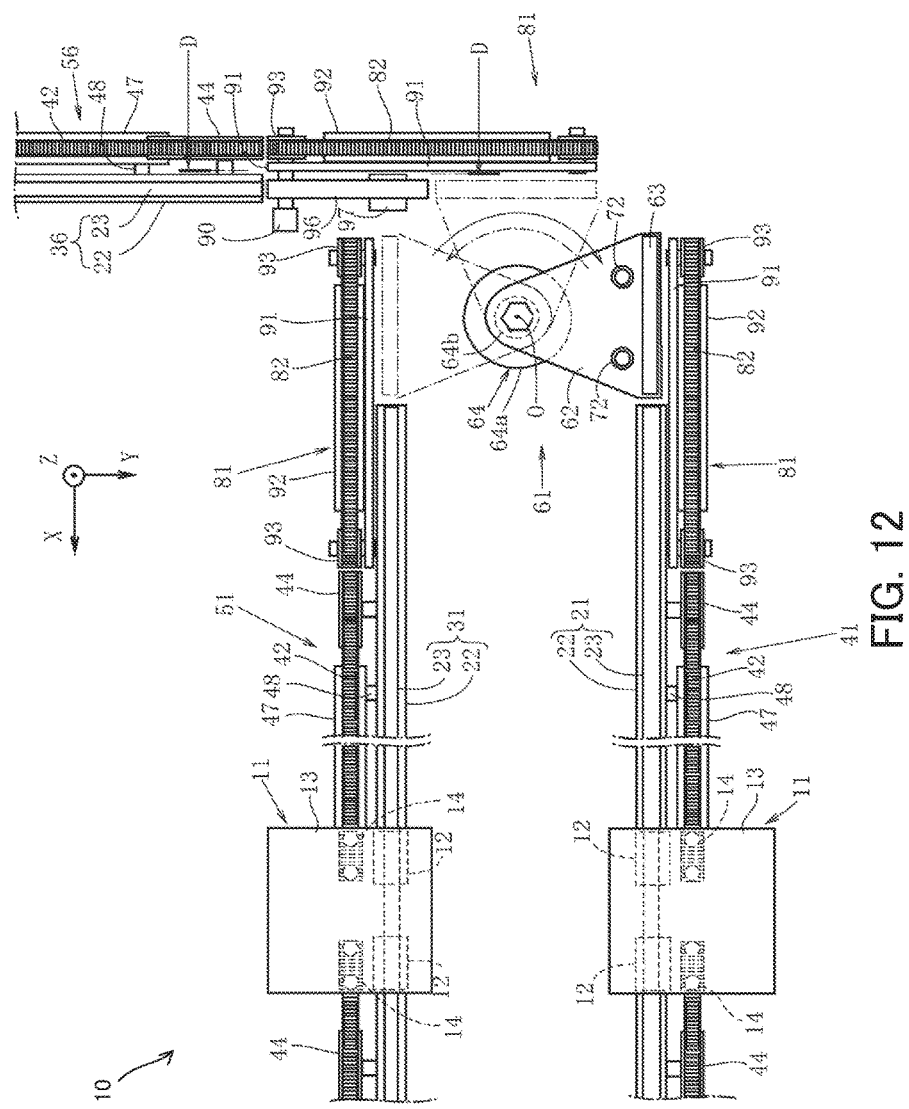
FIG. 12, which corresponds to FIG. 1, is a plan view of three pallet rails that are arranged so as to together form a right angle, and an auxiliary rail that is provided between an intermediate pallet rail and a retaining rail.

Note that the description of the foregoing embodiment pertains to a case where the first and second pallet rails 21, 31 are arranged in parallel to each other at a predetermined interval in the horizontal direction. However, as shown in FIG. 12, the plurality of pallet rails 21, 31 may be arranged in such a manner that a narrow angle formed thereby in the horizontal direction is a right angle or a predetermined angle. Three or more pallet rails may be used.

Here, FIG. 12 shows a case where the pallet transport device 10 includes, in addition to the first and second pallet rails 21, 31 that are arranged in parallel to each other as described in the foregoing embodiment, a third pallet rail 36 that intersects with the first and second pallet rails 21, 31 at a right angle, that is, 90 degrees within a pivoting range of a pivoting member 62; in other words, a total of three pallet rails 21, 31, 36 are provided. The third pallet rail 36 is structured in the same manner as the first and second pallet rails 21, 31.

As shown in FIG. 12, with regard to the first to third pallet rails 21, 31, 36, a moving mechanism 56 and a moving assistance mechanism 81 that are structured in the same manner as those provided for the first and second pallet rails 21, 31 are provided also for the third pallet rail 36, which is arranged so as to be continuous, at a certain position, with the retaining rail 63 that pivots in accordance with the pivoting of the pivoting member 62.

Here, when three or more pallet rails 21, 31, 36 are used, it is necessary to increase an interval between the third pallet rail 36 and the retaining rail 63 existing between the first and second pallet rails 21, 31 in order to smoothly move the retaining rail 63 in accordance with the pivoting of the pivoting member 62. However, simply increasing the interval between the third pallet rail 36 and the retaining rail 63 will not enable the pallets 11 to move between the retaining rail 63 and the third pallet rail 36. In view of this, an auxiliary rail 96 is provided between the third pallet rail 36 and the retaining rail 63 as shown in FIG. 12.

The auxiliary rail 96 is provided along the moving assistance mechanism 81 so as to be continuous with an end portion of the third pallet rail 36 and collinear with the third pallet rail 36. The material of the auxiliary rail 96 is the same as that of a linear-motion guide rail 23 of the third pallet rail 36 and the retaining rail 63. A length of the auxiliary rail 96 is set to be equal to or larger than a length with which the retaining rail 63 is permitted to move between the first and second pallet rails 21, 31 when the auxiliary rail 96 is not present, that is, a length with which the movement of the retaining rail 63 between the first and second pallet rails 21, 31 is not inhibited without the presence of the auxiliary rail 96.

Furthermore, together with the auxiliary rail 96, an auxiliary rail elevator mechanism 97 is provided that causes the auxiliary rail 96 to ascend and descend between a first position that is collinear with the third pallet rail 36 and a second position that is lower than the first position.

Figure 13:
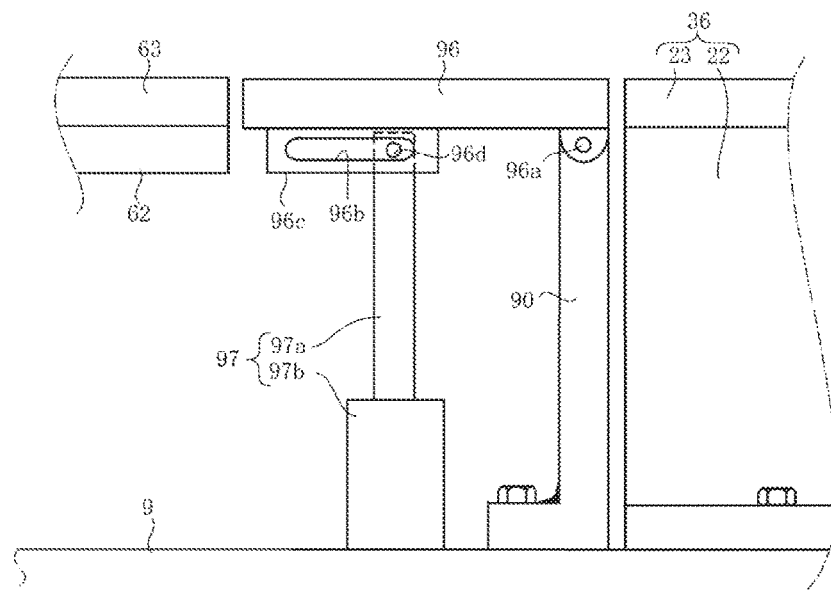
FIG. 13 is a cross-sectional view taken along the line D-D in FIG. 12, and shows a state where the auxiliary rail has ascended.
Figure 14:
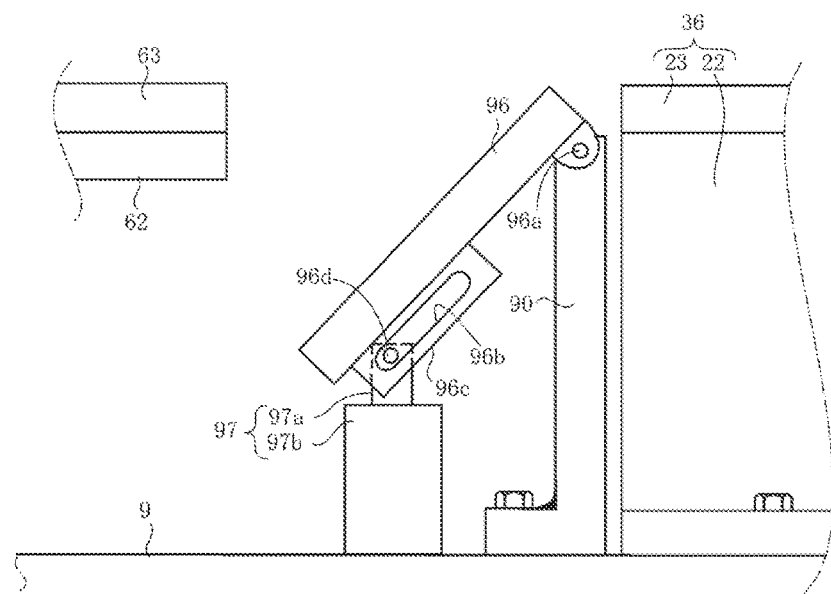
FIG. 14, which corresponds to FIG. 13, shows a state where the auxiliary rail has descended.

As shown in FIGS. 13 and 14, the auxiliary rail 96 has a swing fulcrum point 96a at an end portion thereof near the third pallet rail 36, and is arranged swingably around the swing fulcrum point 96a along a vertical plane. The auxiliary rail elevator mechanism 97 causes an end portion of the auxiliary rail 96 distant from the swing fulcrum point 96a, that is, an end portion of the auxiliary rail 96 opposing the retaining rail 63, to ascend and descend.

Specifically, a rotational support pillar 90 stands on the rack 9 in the vicinity of the end portion of the third pallet rail 36, and the swing fulcrum point 96a, which is provided at the end portion of the auxiliary rail 96 near the third pallet rail 36, is rotatably supported by an upper end of the rotational support pillar 90. The auxiliary rail elevator mechanism 97 is a fluid pressure cylinder 97 having a main body 97b that is fixed to the rack 9 in a state where a reciprocable rod 97a faces upward. An upper end of the reciprocable rod 97a is rotatably supported by the other end of the auxiliary rail 96.

As shown in FIG. 13, when the reciprocable rod 97a of the fluid pressure cylinder 97 projects upward, the auxiliary rail 96 fills the gap between the linear-motion guide rail 23 of the third pallet rail 36 and the retaining rail 63, and thus the linear-motion guide rail 23 and the retaining rail 63 are placed in a state where they are continuous with each other via the auxiliary rail 96.

A locking plate 96c, in which a long hole 96b extending in a longitudinal direction is formed, is attached to the other end side of a lower surface of the auxiliary rail 96. The upper end of the reciprocable rod 97a of the fluid pressure cylinder 97, which is the auxiliary rail elevator mechanism, is rotatably supported by the long hole 96b via a pin 96d. Therefore, as shown in FIG. 14, when the reciprocable rod 97a is inserted into the main body 97b disposed therebelow, the pin 96d provided at the upper end of the reciprocable rod 97a moves along the long hole 96b, and the other end side of the auxiliary rail 96 descends in consequence.

As shown in FIG. 13, when the auxiliary rail 96 fills the gap between the linear-motion guide rail 23 of the third pallet rail 36 and the retaining rail 63, a pallet 11 can be moved from the third pallet rail 36 to the retaining rail 63, or from the retaining rail 63 to the third pallet rail 36, due to the presence of the auxiliary rail 96.

Note that when the auxiliary rail 96 fills the gap between the linear-motion guide rail 23 of the third pallet rail 36 and the retaining rail 63, the retaining rail 63 cannot pivot toward the auxiliary rail 96, and thus the pivoting member 62 provided with the retaining rail 63 cannot pivot freely.

However, causing the other end side of the auxiliary rail 96 opposing the retaining rail 63 to descend will enable the retaining rail 63 to pivot toward the auxiliary rail 96 as shown in FIG. 14. Therefore, in the state shown in FIG. 14, the pivoting member 62 provided with the retaining rail 63 that retains the pallet 11 can pivot freely.

Thus, when the auxiliary rail 96 and the auxiliary rail elevator mechanism 97 are provided, the pallet 11 can be reliably moved between the third pallet rail 36 and the retaining rail 63, and the pivoting member 62 is permitted to pivot freely. As a result, the pallet transport device 10 can move and transport the pallet 11 with respect to any of the plurality of pallet rails 21, 31, 36.

Second Embodiment

Figure 15:
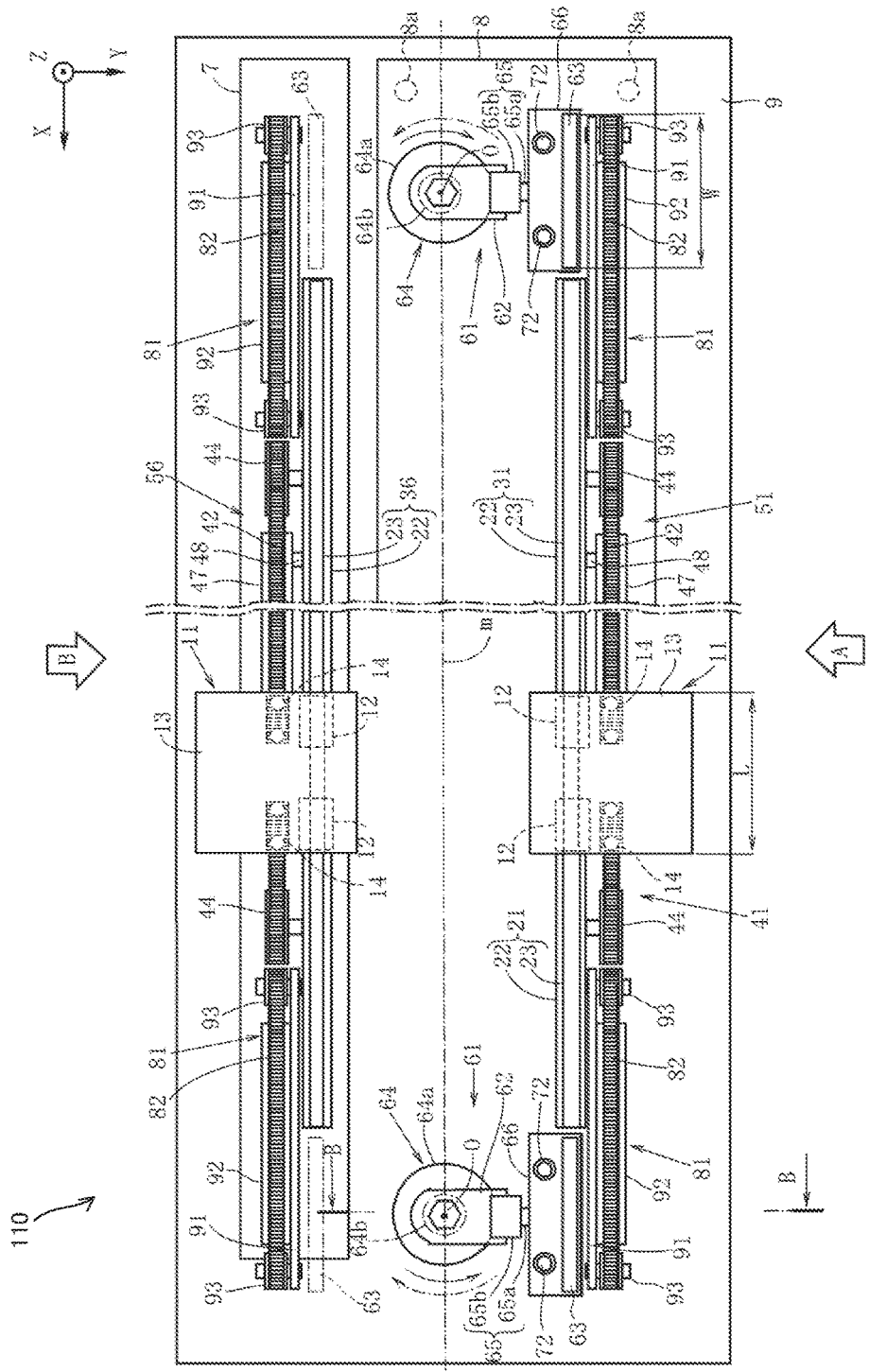
FIG. 15 is a plan view of a pallet transport device according to a second embodiment of the present invention.
Figure 16:
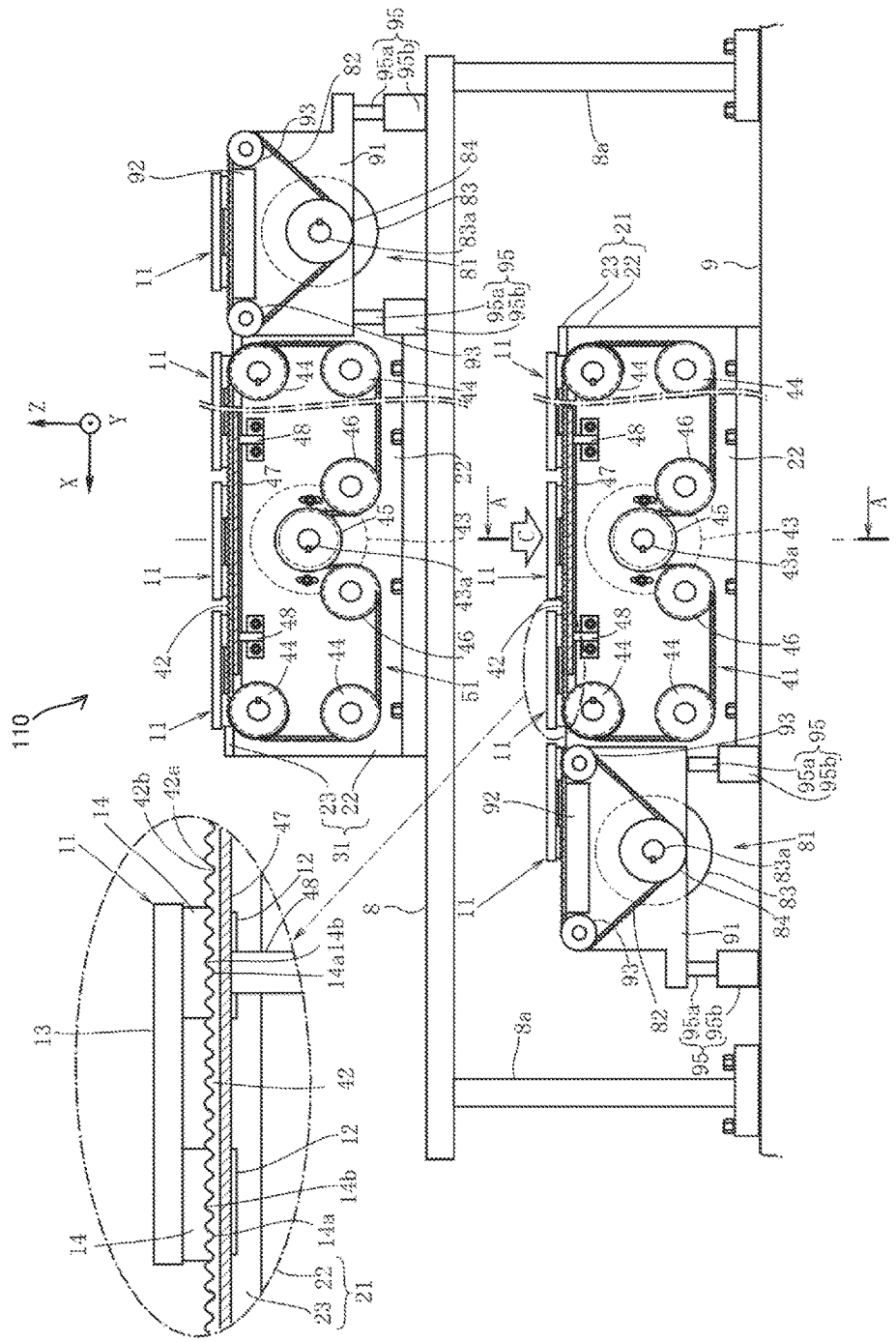
FIG. 16 shows the pallet transport device according to the second embodiment of the present invention as viewed in the direction A in FIG. 15.
Figure 17:
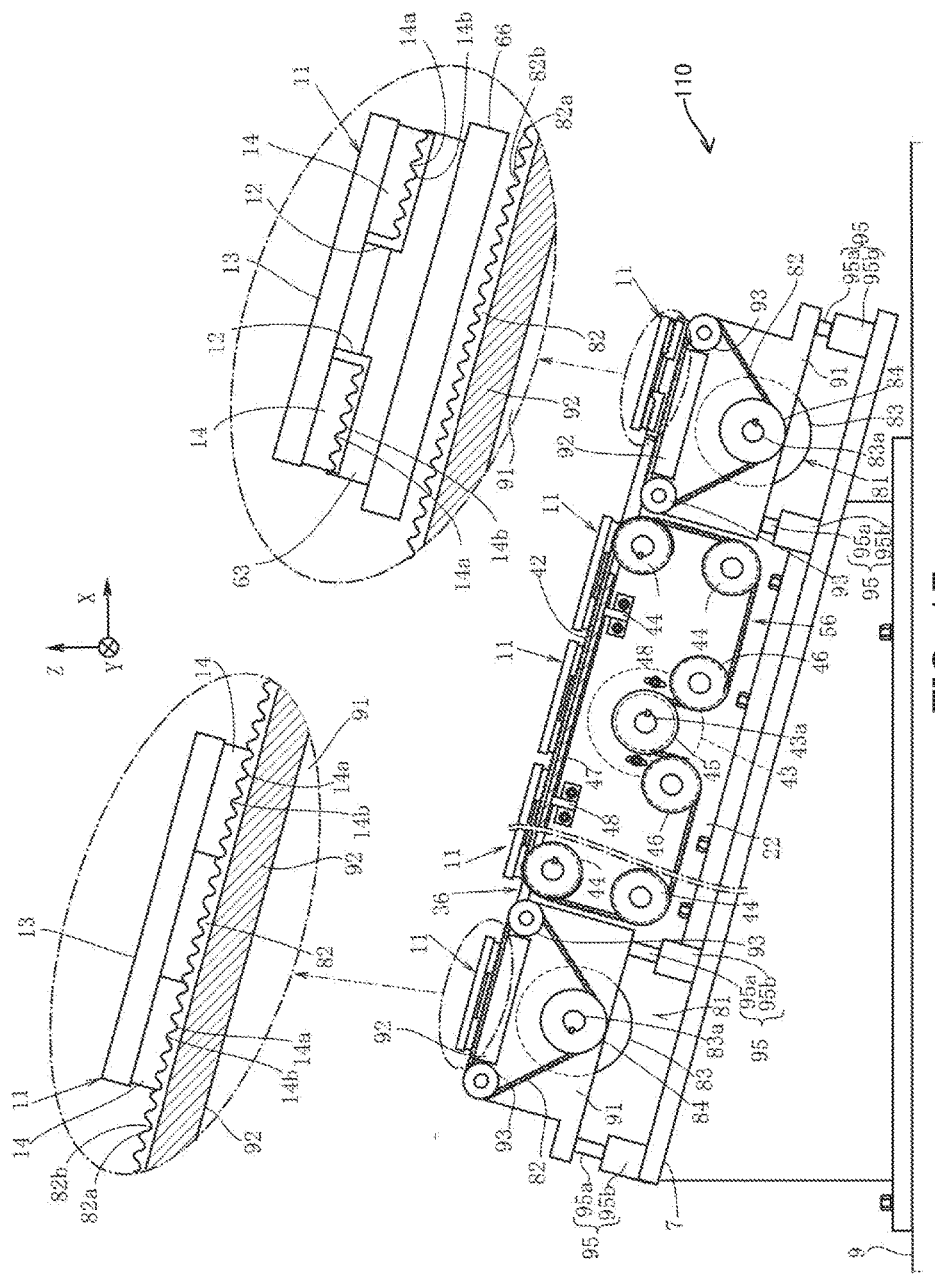
FIG. 17 shows the pallet transport device according to the second embodiment of the present invention as viewed in the direction B in FIG. 15.

The following describes a pallet transport device 110 according to a second embodiment of the present invention with reference to FIGS. 15 to 17. Below, the differences from the first embodiment will be the focus of the description. Components that are similar to those according to the first embodiment, for example, the moving mechanisms 41, 51, 56, the moving assistance mechanisms 81, and the elevator mechanisms 95 will be given the same reference signs, and a description thereof will be omitted.

The pallet transport device 110 according to the second embodiment is intended to enable a smooth movement of pallets, even when pallet rails are tilted with respect to a horizontal plane, or when a plurality of pallet rails intersect at different levels.

The pallet transport device 110 includes a first pallet rail 21, a second pallet rail 31, and a third pallet rail 36 as a plurality of pallet rails by which pallets 11 are movably guided. The first pallet rail 21 and the second pallet rail 31 extend in a horizontally sideways direction (X-axis direction) and are arranged in parallel to each other at a predetermined interval in a vertical direction (Z-axis direction) (FIG. 16). The third pallet rail 36 is arranged in parallel to the first and second pallet rails 21, 31 at a predetermined interval in a horizontally front-back direction (Y-axis direction) when viewed from the top, is tilted with respect to the horizontal plane (FIG. 17), opposes one end of the first pallet rail 21 at one end, and opposes the other end of the second pallet rail 31 at the other end.

As shown in FIG. 16, a horizontal base plate 8 is disposed above the first pallet rail 21, and a support plate 22 of the second pallet rail 31 is mounted on this base plate 8. Accordingly, the first pallet rail 21 and the second pallet rail 31 are arranged in parallel to each other at a predetermined interval in the vertical direction. Note that the base plate 8 is attached to a rack 9 via support pillars 8a.

Furthermore, as shown in FIGS. 15 and 17, on the rack 9, a tilted plate 7 that is tilted with respect to the rack 9 is provided along the horizontally sideways direction (X-axis direction), with the presence of a predetermined interval in the horizontally front-back direction (Y-axis direction) between itself and the first pallet rail 21 and the like when viewed from the above. A support plate 22 of the third pallet rail 36 is mounted on the tilted plate 7. Accordingly, the third pallet rail 36, which opposes one end of the first pallet rail 21 at one end and opposes the other end of the second pallet rail 31 at the other end, is attached to the rack 9 via the tilted plate 7 in a state where the third pallet rail 36 is tilted with respect to the horizontal plane.

Figure 18:
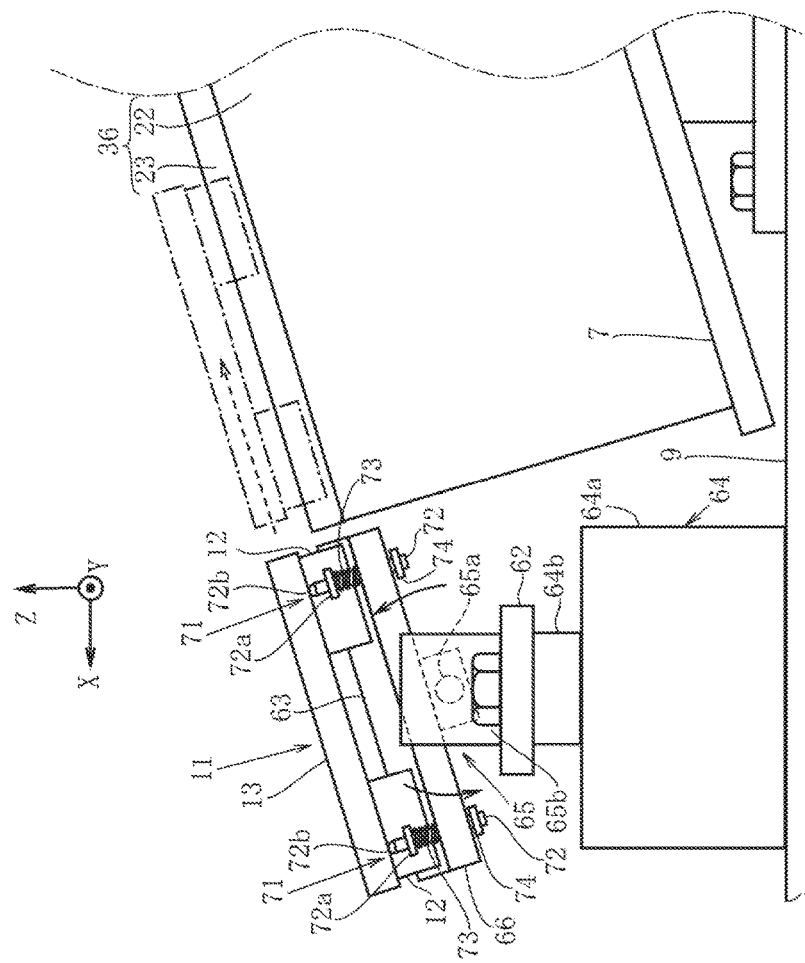
FIG. 18 shows a state where a retaining rail is tilted.

In the present embodiment, as shown in FIGS. 15 and 18, a retaining rail 63 is provided at the other end side of each pivoting member 62 via a motor 65, which is a retaining rail tilting mechanism. Specifically, the motor 65 includes a main body 65*b* and a rotation shaft 65*a* that projects from the main body 65*b*, and the main body 65*b* is attached to the other end side of the pivoting member 62 so that the rotation shaft 65*a* is disposed along a pivot radius direction around a pivot axis O.

The material of the retaining rail 63 is the same as that of linear-motion guide rails 23 of the first to third pallet rails 21, 31, 36. The retaining rail 63 is formed to have a length W (FIG. 15) that is the same as or longer than a length L of pallets 11 in a transport direction (FIG. 15). The retaining rail 63 is attached to the rotation shaft 65*a* of the motor 65 via an attachment plate 66. Furthermore, the attached retaining rail 63 is perpendicular to the rotation shaft 65*a* of the motor 65 so that a length from a rotation axis O to the retaining rail 63 is half the interval between the first pallet rail 21 and the third pallet rail 36.

Accordingly, on a transfer mechanism 61 disposed at one end side of the third pallet rail 36, as the pivoting member 62 pivots around the rotation axis O by 180 degrees, the retaining rail 63 disposed at the other end of the pivoting member 62 reciprocably moves on a semicircular path between one end of the linear-motion guide rail 23 of the first pallet rail 21 and one end of the linear-motion guide rail 23 of the third pallet rail 36. Similarly, on a transfer mechanism 61 disposed at the other end side of the third pallet rail 36, the retaining rail 63 reciprocably moves on a semicircular path between the other end of the linear-motion guide rail 23 of the second pallet rail 31 and the other end of the linear-motion guide rail 23 of the third pallet rail 36.

In a case where the retaining rail 63 is horizontal, when the retaining rail 63 has reached one end of the first pallet rail 21 or the other end of the second pallet rail 31 extending in the horizontal direction, the retaining rail 63 is positioned collinearly with the first pallet rail 21 or the second pallet rail 21.

When the horizontal retaining rail 63 is continuous with the horizontal linear-motion guide rails 23 of the first and second pallet rails 21, 31, the pallets 11 can be moved from the linear-motion guide rails 23 of the first and second pallet rails 21, 31 to the retaining rail 63, or from the retaining rail 63 to the linear-motion guide rails 23.

Meanwhile, as the third pallet rail 36 is tilted with respect to the horizontal plane, in a case where the retaining rail 63 is horizontal, the retaining rail 63 that has reached one end or the other end of the third pallet rail 36 is not in a state where it is positioned collinearly with the linear-motion guide rail 23 of the third pallet rail 36.

However, in the present embodiment, the retaining rail 63 can be tilted with respect to the horizontal plane as shown in FIG. 18. Therefore, by rotating the rotation shaft 65*a* through driving of the motor 65 so as to bring an angle formed between the retaining rail 63, which is disposed perpendicularly to the rotation shaft 65*a*, and the horizontal plane in unison with a tilt angle of the third pallet rail 36, the retaining rail 63 that has reached one end or the other end of the third pallet rail 36 is placed in a state where it is positioned collinearly with the linear-motion guide rail 23 of the third pallet rail 36.

When the tilted retaining rail 63 is continuous with the linear-motion guide rail 23 of the third pallet rail 36 that is tilted with respect to the horizontal plane, the pallets 11 can be moved from the linear-motion guide rail 23 of the third pallet rail 36 to the retaining rail 63, or from the retaining rail 63 to the linear-motion guide rail 23 of the third pallet rail 36.

Furthermore, in the pallet transport device 110, the retaining rail 63 can be tilted along a perpendicular plane that is perpendicular to the pivot radius direction of the pivoting member 62. Therefore, the horizontal pallets 11 that have been transported by the horizontal first and second pallet rails 21, 31 and reached the retaining rail 63 are made tilted together with the retaining rail 63 after, before, or while they are transferred to the end portion of the tilted third pallet rail 36, and transferred to the tilted third pallet rail 36.

That is, in the present embodiment, as the retaining rail 63 can be tilted with respect to the pivoting member 62, even when the pallet rail 36 is tilted with respect to the horizontal plane, the pallets 11 can be moved from the end portion of the tilted pallet rail 36, and the pallets 11 can be moved to the tilted pallet rail 36.

Figure 19:
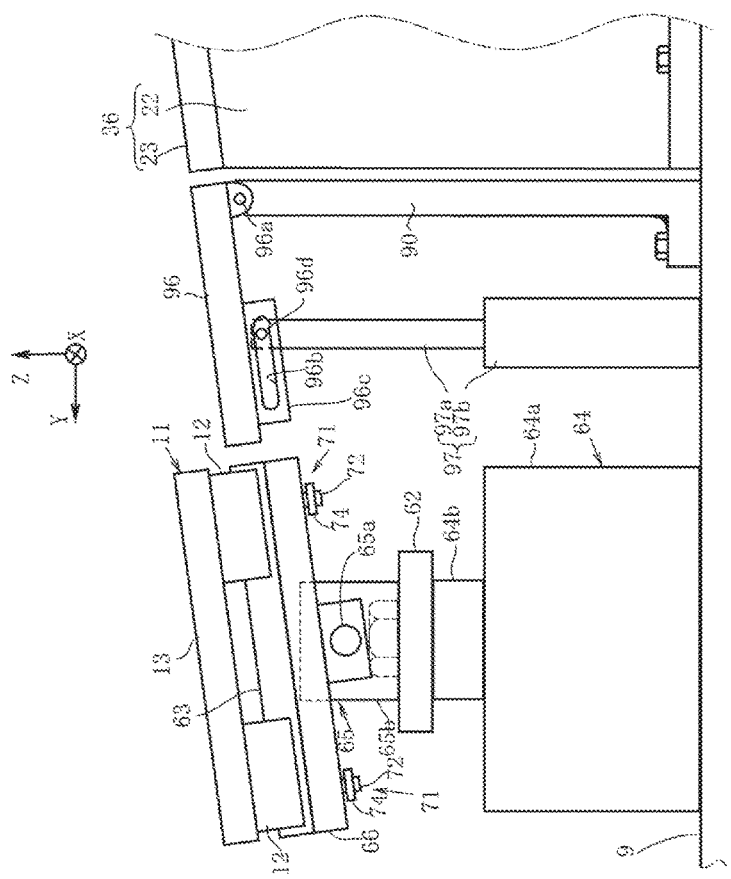
FIG. 19 shows a state where the auxiliary rail has ascended.

Furthermore, in the present embodiment also, as shown in FIG. 19, when the auxiliary rail 96 fills the gap between the tilted linear-motion guide rail 23 of the third pallet rail 36 and the tilted retaining rail 63, the presence of the auxiliary rail 96 enables the pallets 11 to move from the third pallet rail 36 to the retaining rail 63, or from the retaining rail 63 to the third pallet rail 36, similarly to the configuration shown in FIGS. 13 and 14.

Note that each of the foregoing embodiments has depicted a case where the first and second pallet rails 21, 31 that are parallel to each other, as well as the third pallet rail 36 that intersects with them at a right angle (90 degrees), are provided. However, within the pivoting range of the pivoting members 62, for example, the first pallet rail 21 and the second pallet rail 31 may be configured to intersect at a 45-degree angle, and the first pallet rail 21 and the third pallet rail 36 may be configured to intersect at a 135-degree angle.

Furthermore, although each of the foregoing embodiments has depicted an example in which the moving mechanisms 41, 51, 56 include the circulation belts 42 and the circulation mechanisms 43 that circulate the circulation belts 42, the moving mechanisms 41, 51, 56 are not limited in this way, and may be configured in a different way as long as they can transport the pallets 11 along the pallet rails 21, 31, 36.

Furthermore, although the pallets 11 are circulated on a path in the counterclockwise direction in each of the foregoing embodiments, the direction of circulation is not limited to the counterclockwise direction, and each pallet 11 can also be transported in a clockwise direction.

Furthermore, although the fluid pressure cylinders 95 cause the moving assistance mechanisms 81 to ascend and descend as a whole in each of the foregoing embodiments, the engagement between the moving assistance mechanisms 81 and the pallets 11 may be broken as the moving assistance mechanisms 81 pivot in such a manner that one side thereof is lowered.

Furthermore, although the auxiliary rail elevator mechanism causes the other end portion of the auxiliary rail 96 to ascend and descend in each of the foregoing embodiments, the auxiliary rail elevator mechanism 97 may cause the auxiliary rail 96 as a whole to ascend and descend while the auxiliary rail 96 is in a horizontal state.

Furthermore, in each of the foregoing embodiments, the placing tool for placing a workpiece is mounted on one side portion of each base 13. Alternatively, the placing tool may be installed in a through hole formed in each base 13, and a workpiece may be placed in such a manner that it penetrates the base 13 via the through hole.

Furthermore, in each of the foregoing embodiments, the actuators that cause the pivoting members 62 to pivot can cause the rotation rods 64*b* to pivot in the forward direction and the reverse direction within 180 degrees with the aid of a fluid pressure that is supplied to and discharged from the main body portions 64*a*. Alternatively, the actuators may be electric motors that can cause the rotation shafts to pivot within 180 degrees.

The embodiments of the present invention described above are merely illustration of some application examples of the present invention and not of the nature to limit the technical scope of the present invention to the specific constructions of the above embodiments.

The present application claims a priority based on Japanese Patent Application No. 2016-114049 filed with the Japan Patent Office on Jun. 8, 2016 and Japanese Patent Application No. 2016-120419 filed with the Japan Patent Office on Jun. 17, 2016, all the contents of which are hereby incorporated by reference.

The invention claimed is:

1. A pallet transport device comprising:
   a plurality of pallet rails configured to movably guide a pallet;
   a plurality of moving mechanisms provided for the respective pallet rails, the plurality of moving mechanisms being configured to move the pallet along the pallet rails;
   a transfer mechanism including a pivoting member and a retaining rail, the pivoting member being pivotable around a pivot axis in a horizontal direction, the retaining rail being mounted on the pivoting member and capable of retaining the pallet, the transfer mechanism being configured to transfer the pallet guided by one of the pallet rails to another one of the pallet rails using the pivoting member and the retaining rail;
   a moving assistance mechanism configured to move the pallet from the pallet rails to the retaining rail, or from the retaining rail to the pallet rails; and
   an elevator mechanism configured to cause the moving assistance mechanism to ascend and descend, wherein
   when the elevator mechanism has caused the moving assistance mechanism to descend, the transfer mechanism becomes in a state where the transfer mechanism is capable of causing the pivoting member to pivot.

2. The pallet transport device according to claim 1, wherein
   the plurality of pallet rails are arranged in parallel to each other at a predetermined interval in the horizontal direction, or arranged in such a manner that a narrow angle formed thereby in the horizontal direction is a right angle or a predetermined angle.

3. The pallet transport device according to claim 1, wherein
   the moving assistance mechanism includes an endless auxiliary circulation belt arranged circulatably along the retaining rail and end portions of the pallet rails positioned collinearly with the retaining rail,
   projection portions and recess portions are provided on an outer surface of the auxiliary circulation belt in an alternating manner along a longitudinal direction,
   engagement portions engageable with the projection portions and the recess portions are provided on a lower surface of the pallet,
   the ascent of the moving assistance mechanism brings the engagement portions of the pallet into engagement with the projection portions and the recess portions of the auxiliary circulation belt, and
   the descent of the moving assistance mechanism releases the engagement between the engagement portions and the projection portions and the recess portions.

4. The pallet transport device according to claim 1, further comprising:
   an auxiliary rail provided continuously with the pallet rails, the auxiliary rail being provided along the moving assistance mechanism; and
   an auxiliary rail elevator mechanism configured to cause the auxiliary rail to ascend and descend, wherein
   the auxiliary rail elevator mechanism causes the auxiliary rail to ascend and descend between a first position where the auxiliary rail is collinear with the pallet rails and a second position lower than the first position.

5. The pallet transport device according to claim 4, wherein
   the auxiliary rail has a swing fulcrum point at a portion thereof near the pallet rails, and is provided swingably around the swing fulcrum point along a vertical plane, and the auxiliary rail elevator mechanism causes a portion of the auxiliary rail distant from the swing fulcrum point to ascend and descend.

6. The pallet transport device according to claim 1, wherein
   the retaining rail is provided in such a manner that a tilt thereof in a longitudinal direction is changeable with respect to a horizontal plane.

7. The pallet transport device according to claim 6, wherein
   the plurality of pallet rails include at least one tilted pallet rail tilted with respect to the horizontal plane, and
   the moving mechanisms provided along the tilted pallet rail are tilted with respect to the horizontal plane in accordance with a tilt of the tilted pallet rail.

* * * * *